United States Patent
Yang

(10) Patent No.: US 10,959,149 B2
(45) Date of Patent: Mar. 23, 2021

(54) METHOD AND APPARATUS FOR MANAGING RADIO LINK

(71) Applicant: ZTE Corporation, Guangdong (CN)

(72) Inventor: Li Yang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/273,049

(22) Filed: Feb. 11, 2019

(65) Prior Publication Data

US 2019/0313314 A1 Oct. 10, 2019

Related U.S. Application Data

(63) Continuation of application No. PCT/CN2017/094147, filed on Jul. 24, 2017.

(30) Foreign Application Priority Data

Aug. 10, 2016 (CN) .......................... 201610654549.1

(51) Int. Cl.
| | |
|---|---|
| *H04W 36/30* | (2009.01) |
| *H04W 24/08* | (2009.01) |
| *H04W 24/10* | (2009.01) |

(52) U.S. Cl.
CPC .......... *H04W 36/30* (2013.01); *H04W 24/08* (2013.01); *H04W 24/10* (2013.01)

(58) Field of Classification Search
CPC ..... H04W 36/30; H04W 24/08; H04W 24/10; H04W 48/16; H04L 5/0048; H04B 7/0695

See application file for complete search history.

(56) References Cited

U.S. PATENT DOCUMENTS

| | | | |
|---|---|---|---|
| 9,980,120 B2 * | 5/2018 | Lee ........................ | H04W 48/18 |
| 10,524,150 B2 * | 12/2019 | Moon .................... | H04L 5/0048 |

(Continued)

FOREIGN PATENT DOCUMENTS

| | | |
|---|---|---|
| CN | 101300760 A | 11/2008 |
| CN | 105052199 A | 11/2015 |

(Continued)

OTHER PUBLICATIONS

European Patent Office, Extended European Search Report dated May 29, 2020 for European Patent Application No. 17838553.0, 9 pages.

(Continued)

*Primary Examiner* — Phirin Sam
*Assistant Examiner* — Louis Samara
(74) *Attorney, Agent, or Firm* — Perkins Coie LLP

(57) ABSTRACT

Provided are a method and apparatus for managing radio link. The method includes: receiving radio resource management (RRM) measurement parameters transmitted through radio resource control (RRC) signaling by a base station; according to the RRM measurement parameters, performing RRM measurement on a plurality of beams or all of beams governed by a target beamforming (BF) offloading base station transmit receive point (TRP) to obtain RRM measurement results; and jointly evaluating the RRM measurement results of the plurality of beams or all of beams, and handing over, according to the evaluating result, from a TRP of source offloading base station with beamforming to the TRP of target offloading base station with beamforming, or adding additionally the target BF offloading base station TRP.

15 Claims, 9 Drawing Sheets

(56) References Cited

U.S. PATENT DOCUMENTS

2014/0073329 A1    3/2014   Kang et al.
2015/0257073 A1    9/2015   Park et al.

FOREIGN PATENT DOCUMENTS

| CN | 105830483 A | 8/2016 |
|---|---|---|
| KR | 20160094337 A | 8/2016 |
| WO | 2015109153 A1 | 7/2015 |
| WO | 2016044994 A1 | 3/2016 |

OTHER PUBLICATIONS

International Search Report and Written Opinion dated Sep. 30, 2017 for International Application No. PCT/CN2017/094147, 12 pages.

\* cited by examiner

METHOD AND APPARATUS FOR MANAGING RADIO LINK

CROSS REFERENCE TO RELATED APPLICATIONS

This patent document is a continuation of and claims priority to International Patent Application No. PCT/CN2017/094147, filed on Jul. 24, 2017, which claims the benefit of priority of Chinese Patent Application No. 201610654549.1, filed on Aug. 10, 2016. The entire contents of the before-mentioned patent applications are incorporated by reference as part of the disclosure of this application.

TECHNICAL FIELD

The present application relates to, but is not limited to, communications and, in particular, relates to a method and an apparatus for managing radio link.

BACKGROUND

In a new radio access technology (RAT/radio, NR) system newly designed by the future 3rd generation partnership project fifth generation (3GPP 5G), use and operation of high frequency band radio carrier resources will play an increasingly important role. By means of carrier aggregation, tightly coupling and multi-connectivity, wider high frequency carrier resources can be fully aggregated to improve the capacity and throughput performance of the NR system. As shown in FIG. 1, under a wide coverage of a macro base station cell at low frequency, the operator can perform capacity enhancement on some hotspots through a micro base station small cell at high frequency (mmWave). Different from the coverage of a traditional omni-directional cell or sector cell, the TX/RX side of the small cell at high frequency needs to perform a beamforming operation to increase the uplink and downlink radio coverage and channel performance, that is, the TX/RX side needs to directionally transmit/directionally receive beams through the multi-antenna phase technology, so as to aggregate a transmit power/reduce interference. The transmit receive point cluster (TRP Cluster) in FIG. 1 transmits signals via multiple beams.

The deployment mode of communication base station small cell with beamforming (BF) at high frequency in FIG. 1 can be mapped onto the data transmission architecture shown in FIG. 2 in which the communication base station at high frequency and communication base station at low frequency are tightly coupled and in multi-connectivity. FIG. 2 shows the air interface between the base station and the user equipment (UE), the thin arrow line designates Uu interface control plane signaling, and the thick arrow line designates user plane data. The macro base station serving cell at low frequency provides the basic radio coverage, and the small base station at high frequency in the BF mode provides data offloading. When the UE moves in the same macro base station serving cell, the UE may be handed over between micro base stations at high frequency or may have more data transmissions.

For example, the universal mobile telecommunications system/long term evolution (UMTS/LTE) system mostly works in the low frequency band (<6 GHz), therefore, a transmit receive point (TRP) of the corresponding base station usually adopts an omni-directional and sector transmit receive mode. So the corresponding downlink common channel/signal has a wide coverage area. That is, when the UE enters a region with a specific radius and centered on the TRP, the UE can receive the downlink common channel/signal at any time/place/direction and perform basic operations such as downlink time-frequency synchronization, cell discovery and residence, system message reading, uplink random access, pilot measurement.

The high frequency band channel has severe path loss and attenuation. In order to achieve the long-distance coverage and isolation of spatial/time-frequency signal interference by reducing transmit power, the NR high frequency TRP of the base station usually adopts a beamforming transmit receive mode. Therefore, the corresponding downlink common channel/signal has a relatively narrow coverage area (the corresponding serving cell is relatively narrow). That is, when the UE enters a region with a specific radius and centered on the TRP, the UE can only receive the downlink common channel/signal at the specific time/location/direction, and the UE needs to perform spatial search to achieve the above basic operations. With the movement of the UE in the horizontal and vertical directions, the UE is easily to be out of the coverage of the beams, which is called spatial/time-frequency desynchronization (assuming that TRP/UE cannot timely track each other's beam). After the spatial/time-frequency desynchronization, it equals that the UE moves to the weak coverage area and cannot effectively maintain the uplink and downlink time-frequency synchronization/uplink random access/efficient data transmission, therefore, the UE should search and measure an appropriate cell/beam again as soon as possible to restore to the space/time-frequency synchronization state.

Assuming that only one RF chain is provided in the TRP node, the TRP transmits any downlink channel/signal in a periodic circular scanning manner. When the UE successfully tracks and resides at a certain high frequency beamforming serving cell and has data transmission demand, the UE needs to establish a radio link (RL) with the TRP and enters a radio resource control CONNECTED (RRC CONNECTED) mode. Then the TRP allocates dedicated time-frequency resources to the UE, and performs uplink and downlink data block transmission based on a scheduling manner.

In the downlink direction, on one hand, the UE needs to maintain the best spatial/time-frequency tracking state through a downlink common synchronization signal transmitted by the TRP; on the other hand, the UE needs to measure channel state information (CSI) through a downlink dedicated reference signal transmitted by the TRP and sends a CSI feedback.

In the uplink direction, on one hand, the TRP needs to maintain the best spatial/time-frequency tracking state through an uplink common synchronization signal transmitted by the UE; on the other hand, the TRP needs to measure CSI through an uplink dedicated reference signal transmitted by the UE.

For the original purpose, the uplink and downlink dedicated reference signals are used for the dedicated channel measurement and/or demodulation. However, whether they can also be used for the beam tracking, that is, in the downlink direction, whether the UE can only monitor and receive the downlink dedicated reference signal transmitted by the TRP to maintain the best downlink spatial/time-frequency tracking state; while in the uplink direction, whether the TRP can only monitor and receive the uplink dedicated reference signal transmitted by the UE to maintain the best uplink spatial/time-frequency tracking state. When the radio link failure (RLF) occurs (such as encountering blockage or deafness), the UE in uplink and downlink transmission state automatically enters a spatial/time-frequency desynchronization substate (but the UE is still in the RRC CONNECTED mode). In this case, the UE still needs to monitor the downlink dedicated reference signal of a source serving TRP around the spatial/time-frequency desynchronization point, and the source TRP still needs to monitor the uplink dedicated reference signal around the spatial/time-frequency desynchronization point, so that the UE tries to restore a beam synchronization substate with the source serving TRP. If the UE cannot restore the beam synchronization substate in a specific time, the UE needs to exit the RRC CONNECTED state first, monitors and receives the downlink common channel/signal of the source serving TRP and other neighboring TRPs again, in this case, the UE can reside at serving cells of the other neighboring TRPs and establishes a dedicated RL.

For example, in the downlink direction, when the TRP transmits the BF synchronization training signal, the TRP firstly circularly transmits the BF synchronization training signal with a specific angle interval (such as the horizontal 0, 30, 60, 90, 120 . . . 360 degrees), and the UE may also directionally receive at specific discrete angles. After the primary "rough synchronization training", the TRP and the UE can roughly determine the best discrete angle of each other, and then can further enter the "fine synchronous training" stage. In the "fine synchronous training" stage, the TRP and the UE can more accurately determine the continuous angle of each other (the horizontal angle adjustment granularity of the "fine synchronous training" is smaller than the discrete angle of the previous circular transmission). The fine synchronization training minimizes the path loss. Then, with the movement of the UE, the TRP and the UE need to continuously and finely adjust the transmission angle and reception angle according to the BF synchronization training signal transmitted by each other. The above process is shown in FIG. 3.

The "fine synchronization training" is an optional optimization function implemented locally based on the communication node hardware. After the "fine synchronization training" is completed, the TRP side and the UE side can guarantee the best radio resource management (RRM) measurement result and the most reliable measurement accuracy of a beam reference signal (BRS), and guarantee the best receive reception demodulation performance result of a radio link (RL) dedicated signal. Therefore, the TRP and the UE can be in the best RRM measurement mode and data transmission mode. In this case, the signal transmission efficiency at a TX end and the signal-to-noise ratio received at RX end are the biggest. Otherwise, according to simulation, if the accuracy of the spatial/time-frequency synchronization training is insufficient, the receiving signal-to-noise ratio will decrease, and the TRP and the UE cannot be in the best RRM measurement mode and data transmission mode. Even worse, the spatial/time-frequency desynchronization occurs between the TRP and the UE and they can only be in the worst RRM measurement mode and data transmission mode. Therefore, in order to ensure the UE can perform the RRM measurement on the downlink reference signal of the beamforming communication base station with enough quality and accuracy, the UE establishes and maintains a "rough (fine) synchronization substate" for the beams governed by the target BF communication base station, otherwise, the RRM measurement results are inaccurate and unreliable.

When the UE in the multi-connectivity data transmission mode is moving, the non-beamforming anchor communication base station usually needs to select and configure, based on the RRM measurement report result of the UE, the best TRP of the target offloading base station with beamforming for the UE, or perform handover for mobility among TRPs, or configure more TRPs for multi-connectivity data transmission. According to the LTE RRM measurement evaluation model, as shown in FIG. 4: for a specific measurement object (a LTE target cell or a beam under the TRP) and measurement evaluation, A is an initial measurement sampling value measured by the UE according to the internal implementation, B is an intermediate measurement sampling value obtained by the UE through filtering by using the Layer 1 Filtering module layer 1 in a certain sampling period, and C is a dynamic analysis evaluation value obtained by the UE through filtering by using the Layer 3 Filtering model in a certain sampling period, C' is a comparative analysis evaluation value (having a same measurement evaluation dimension as C), and D is a content result value reported in measurement report (MR) message by the UE. In the old RRM measurement model, behaviors and parameter using manners of the L3 filtering module and an evaluation of reporting criteria module are standardized by the LTE protocol. Relevant configuration parameters are from configuration signaling in a RRC air interface message.

The current LTE protocol has defined multiple RRM measurement event types for handover for mobility and multi-connectivity configuration operations for different purposes. For example, an Event A1 represents: the UE makes a dynamic analysis evaluation result (having filtered through the layer 3) of measured reference signal receiving power (RSRP) and reference signal receiving quality (RSRQ) of the current LTE serving cell (which may be one or more), the measurement dynamic analysis evaluation result is better than a threshold value "Thresh" configured by a source base station eNB through RRC air interface signaling (better than "Thresh" Plus a Hysteresis offset value Hys), and such as condition lasts for an event trigger period "time to trigger (TTT)", such that the UE triggers the local generation of the event A1 and triggers MR reporting, otherwise the event A1 cannot be generated. For definitions of other events, reference may be made to the LTE protocol. The old RRM measurement model and definition described above have the following characteristics: for a certain RRM measurement event, it is only associated with a certain determined source serving cell and/or a certain determined neighbour cell, forming a 1-to-1 cell measurement comparative evaluation pair.

For an offloading micro TRP of the base station in a beamforming working mode, working characteristics of multiple Beams governed by the offloading micro TRP of the base station are very different from that of multiple LTE serving cells governed in the traditional LTE base station, as described in the above background. If the LTE RRM measurement evaluation mechanism is used, when the RRM measurement result corresponding to a target serving beam governed by a certain target TRP 2 is much better than that of a source serving beam governed by a certain source TRP 1, the UE is very likely to trigger a corresponding mobility event and report the mobility event to an anchor control macro base station through the MR message. The anchor control macro base station will cause, through the RRC reconfiguration message, the UE to establish the radio link (RL) between the UE and the target serving beams governed by the target TRP 2 (because the link quality of the target serving beam is better), and delete the previous RL between the UE and the source serving beam governed by the source TRP 1 (because the link quality of this source serving beam gets worse). The process is shown in FIG. 5. The UE is originally in a dual-connectivity data transmission state in which the UE is connected to the master base station macro serving cell MeNB and a certain source serving beam of the TRP 1. Later, due to the movement of the UE, the UE is handed over and reconfigured to a dual-connectivity n data transmission state with the MeNB and a certain beam of the TRP 2 through an anchor.

Since each TRP of the offloading base station is usually configured with multiple activated serving beams (covers regions with different physical directions in a specific way), the UE performs the above-mentioned rough (fine) spatial/time-frequency tracking synchronization attempt as well as the corresponding RRM measurement on different beams in order to establish and maintain a "rough (fine) synchronization substate", thereby obtaining accurate and reliable RRM measurement results. Therefore, the UE frequently performs a beam switch operation among beams of the TRP, i.e., automatically switching from a certain Beam1 with a poor signal to another Beam2 with a better signal in the same TRP. In this manner, a single Beam cannot fully reflect the overall and comprehensive quality of the radio coverage service of the TRP of the offloading base station. For example, if the TRP 2 in FIG. 5 has four downlink serving beams, which transmit synchronization and pilot signals in different downlink directions, the UE is easily to implement the synchronization tracking and enter the "rough (fine) synchronization substate" with one of beams, a Beam3, and obtains a good RRM measurement result. However, if the Beams 1, 2, 4 of the TRP2 are relatively poor, it is not easy for the UE to implement the synchronization tracking with them, and accordingly the UE cannot enter the "rough (fine) synchronization substate", or the RRM measurement results obtained by the UE are also relatively poor. Therefore, the TRP2 is not a good target TRP for handover for mobility. Once the Beam3 is blocked by spatial/time-frequency temporary obstacles, for example, the Blockage occurs, the UE has to try to switch the local beam to other poor Beam1/2/4, or triggers air interface signaling to enable the master anchor base station to reconfigure the target TRP, so a better data offloading transmission service may not be obtained.

SUMMARY

The following is a summary of the subject matter described herein in detail. This summary is not intended to limit the scope of the claims.

Embodiments of the present disclosure provide a method and an apparatus for managing a radio link to avoid a poor mobility performance when the terminal uses the beam as the granularity to perform the radio resource control measurement evaluation and is handed over among beamforming base stations.

An embodiment of the present disclosure provides a method for managing a radio link. The method includes: receiving radio resource management (RRM) measurement parameters transmitted by a base station, where the RRM measurement parameters are transmitted through radio resource control (RRC) signaling; according to the RRM measurement parameters, performing RRM measurement on multiple beams or all of beams governed by a target beamforming (BF) offloading base station transmit receive point (TRP) to obtain RRM measurement results; and jointly evaluating the RRM measurement results of the multiple beams or all of the beams, and handing over, according to the evaluating result, from a TRP of a source offloading base station with beamforming to the TRP of the target offloading base station with beamforming, or adding additionally the TRP of the target offloading base station with beamforming.

In one implementation mode, the jointly evaluating the RRM measurement results of the multiple beams or all of the beams includes: acquiring, the RRM measurement results of the multiple beams or all of the beams governed by the TRP of the target offloading base station with beamforming; and jointly evaluating, according to a predetermined RRM measurement result evaluation model, the acquired RRM measurement results.

In one implementation mode, jointly evaluating, according to the predetermined RRM measurement result evaluation model, the acquired RRM measurement results includes: taking the RRM measurement results of the multiple beams or all of the beams governed by the TRP of the target offloading base station with beamforming as parallel initial measurement sampling values; filtering concurrently, according to a predetermined sampling period, the initial measurement sampling values to obtain parallel intermediate measurement sampling values; and performing a weighted average processing on the parallel intermediate measurement sampling values in a predefined manner to obtain one joint evaluation value outputted serially, and evaluating the joint evaluation value by comparing the joint evaluation value with a comparative analysis evaluation value according to a preset inequality rule to obtain a comparative evaluation result, where the joint evaluation value and the comparative analysis evaluation value have a same measurement evaluation dimension.

In one implementation mode, after obtaining the joint evaluation value and the comparative evaluation result, the method further includes: reporting, according to the RRM measurement result evaluation reporting criteria, the joint evaluation value and the comparative evaluation result.

In one implementation mode, reporting, according to the RRM measurement result evaluation reporting criteria, the joint evaluation value and the comparative evaluation result includes: determining whether the joint evaluation value and the comparative evaluation result satisfy a predefined RRM measurement event, where the RRM measurement event is an event defined by standards of an air interface protocol of a new radio (NR) access system; and in response to that the joint evaluation value and the comparative evaluation result satisfy the predefined RRM measurement event or a preset condition set is satisfied, reporting the evaluation result through a measurement report over an air interface between a terminal and a master anchor base station.

In one implementation mode, the RRM measurement event is associated with multiple beams or all of beams governed by a TRP, or the RRM measurement event is associated with multiple beams or all of beams governed by a TRP and multiple beams or all of beams governed by another TRP, such that multiple parallel RRM measurement sampling results are generated after the RRM measurement.

Another embodiment of the present disclosure provides a method for managing a radio link. The method includes: performing RRM measurement on multiple beams or all of beams transmitted by a terminal and obtaining RRM measurement results; evaluating the RRM measurement results of the multiple beams or all of the beams; instructing, according to the evaluating result, the terminal to hand over from a TRP of a source offloading base station with beamforming to a TRP of the target offloading base station with beamforming, or adding additionally the TRP of the target offloading base station with beamforming; or adding, according to the evaluating result, a TRP of the offloading base station with beamforming and activating the added TRP; or deleting, according to the evaluating result, a deactivated and configured TRP of the offloading base station with beamforming.

In one implementation mode, evaluating the RRM measurement results of the multiple beams or all of the beams includes: acquiring, the RRM measurement results of the multiple beams or all of the beams transmitted by the terminal; and evaluating, according to a predetermined RRM measurement result evaluation model, the acquired RRM measurement results.

In one implementation mode, evaluating, according to the predetermined RRM measurement result evaluation model, the acquired RRM measurement results includes: taking the RRM measurement results of the multiple beams or all of the beams transmitted by the terminal as parallel initial measurement sampling values; filtering concurrently, according to a predetermined sampling period, the initial measurement sampling values to obtain parallel intermediate measurement sampling values; and performing a weighted average processing on the parallel intermediate measurement sampling values in a predefined manner to obtain one joint evaluation value outputted serially, and evaluating the joint evaluation value by comparing the joint evaluation value with a comparative analysis evaluation value according to a preset inequality rule to obtain a comparative evaluation result, where the joint evaluation value and the comparative analysis evaluation value have a same measurement evaluation dimension.

In one implementation mode, after obtaining the joint evaluation value and the comparative evaluation result, the method further includes: reporting, according to the RRM measurement result evaluation reporting criteria, the joint evaluation value and the comparative evaluation result.

In one implementation mode, reporting, according to the RRM measurement result evaluation reporting criteria, the joint evaluation value and the comparative evaluation result includes: determining whether the joint evaluation value and the comparative evaluation result satisfy a predefined RRM measurement event, where the RRM measurement event is an event defined by standards of an air interface protocol of a new radio (NR) access system; and in response to that the joint evaluation value and the comparative evaluation result satisfy the predefined RRM measurement event or a preset condition set is satisfied, reporting the evaluation result through a measurement report over a ground interface between an offloading base station and a master anchor base station.

In one implementation mode, the RRM measurement event is associated with multiple beams or all of beams governed by a TRP, or the RRM measurement event is associated with multiple beams or all of beams governed by a TRP and multiple beams or all of beams governed by another TRP, such that multiple parallel RRM measurement sampling results are generated after the RRM measurement.

Another embodiment of the present disclosure provides an apparatus for managing a radio link, applied to a terminal. The apparatus includes: a receiving module, which is configured to receive radio resource management (RRM) measurement parameters transmitted through radio resource control (RRC) signaling by a base station; a first obtaining module, which is configured to perform, according to the RRM measurement parameters, RRM measurement on multiple beams or all of beams governed by a target beamforming (BF) offloading base station transmit receive point (TRP) to obtain RRM measurement results; and a first managing module, which is configured to evaluate the RRM measurement results of the multiple beams or all of the beams, and hand over, according to the evaluating result, from the TRP of a source offloading base station with beamforming to the TRP of the target offloading base station with the target beamforming, or add additionally the TRP of the target offloading base station with beamforming.

In one embodiment, the first managing module includes: a first acquiring unit, which is configured to acquire the RRM measurement results of the multiple beams or all of beams governed by a TRP of the target offloading base station with beamforming; and a first evaluating unit, which is configured to evaluate, according to a predetermined RRM measurement result evaluation model, the acquired RRM measurement results.

In one embodiment, the first evaluating unit includes: a first configuration subunit, which is configured to take the RRM measurement results of the multiple beams or all of the beams governed by the TRP of the target offloading base station with beamforming as parallel initial measurement sampling values; a first obtaining subunit, which is configured to filter concurrently, according to a predetermined sampling period, the initial measurement sampling values, and obtain parallel intermediate measurement sampling values; and a first processing subunit, which is configured to perform a weighted average processing on the parallel intermediate measurement sampling values in a predefined manner and obtain one joint evaluation value outputted serially, and evaluate the joint evaluation value by comparing the joint evaluation value with a comparative analysis evaluation value according to a preset inequality rule to obtain a comparative evaluation result, where the joint evaluation value and the comparative analysis evaluation value have a same measurement evaluation dimension.

In one embodiment, the first evaluating unit further includes: a first reporting subunit, which is configured to report according to the RRM measurement result evaluation reporting criteria, the joint evaluation value and the comparative evaluation result after obtaining the joint evaluation value and the comparative evaluation result.

In one embodiment, the first reporting subunit includes: a first determining secondary subunit, which is configured to determine whether the joint evaluation value and the comparative evaluation result satisfy a predefined RRM measurement event, where the RRM measurement event is an event defined by standards of an air interface protocol of a new radio (NR) access system; and a first reporting secondary subunit, which is configured to report, in response to that the joint evaluation value and the comparative evaluation result satisfy the predefined RRM measurement event or a preset condition set is satisfied, the evaluation result through a measurement report over an air interface between a terminal and a master anchor base station.

In one implementation mode, the RRM measurement event is associated with multiple beams or all of beams governed by a TRP, or the RRM measurement event is associated with multiple beams or all of beams governed by a TRP and multiple beams or all of beams governed by another TRP, such that multiple parallel RRM measurement sampling results are generated after the RRM measurement.

Another embodiment of the present disclosure provides an apparatus for managing a radio link, applied to an offloading base station. The apparatus includes: a second obtaining module, which is configured to perform RRM measurement on multiple beams or all of beams transmitted by a terminal and obtain RRM measurement results; a second managing module, which is configured to evaluate the RRM measurement results of the multiple beams or all of the beams; and instruct, according to the evaluating result, the terminal to hand over from a TRP of the source offloading base station with beamforming to a TRP of the target offloading base station with beamforming, or add additionally the TRP of the target offloading base station with beamforming; or add, according to the evaluating result, a TRP offloading base station with BF and activate the added TRP; or delete, according to the evaluating result, a deactivated and configured TRP of the offloading base station with BF.

In one implementation mode, the second managing module includes: a second acquiring unit, which is configure to acquire the RRM measurement results of the multiple beams or all of the beams transmitted by the terminal; and a second evaluating unit, which is configured to evaluate, according to a predetermined RRM measurement result evaluation model, the acquired RRM measurement results.

In one embodiment, the second evaluating unit includes a second configuration subunit, which is configured to take the RRM measurement results of the multiple beams or all of the beams transmitted by the terminal as parallel initial measurement sampling values; a second obtaining subunit, which is configured to filter concurrently, according to a predetermined sampling period, the initial measurement sampling values to obtain parallel intermediate measurement sampling values; and a second processing subunit, which is configured to perform a weighted average processing on the parallel intermediate measurement sampling values in a predefined manner and obtain one joint evaluation value outputted serially, and evaluate the joint evaluation value by comparing the joint evaluation value with a comparative analysis evaluation value according to a preset inequality rule to obtain a comparative evaluation result, where the joint evaluation value and the comparative analysis evaluation value have a same measurement evaluation dimension.

In one embodiment, the second evaluating unit includes a second reporting subunit, which is configured to report, after obtaining the joint evaluation value and the comparative evaluation result the joint evaluation value and the comparative evaluation result according to the RRM measurement result evaluation reporting rule.

In one embodiment, the second reporting subunit includes a second determining secondary subunit, which is configured to determine whether the joint evaluation value and the comparative evaluation result satisfy a predefined RRM measurement event, where the RRM measurement event is an event defined by standards of an air interface protocol of a new radio (NR) access system; and a second reporting secondary subunit, which is configured to report, in response to that the joint evaluation value and the comparative evaluation result satisfy the predefined RRM measurement event or a preset condition set is satisfied, the evaluation result through a measurement report over a ground interface between an offloading base station and a master anchor base station.

In one implementation mode, the RRM measurement event is associated with multiple or all of beams governed by a TRP, or the RRM measurement event is associated with the multiple or all of beams governed by a TRP and multiple or all of beams governed by another TRP, such that multiple parallel RRM measurement sampling results are generated after the RRM measurement.

Another embodiment of the present disclosure provides a storage medium. The storage medium is configured to store program codes for executing the following steps:

receiving radio resource management (RRM) measurement parameters transmitted through radio resource control (RRC) signaling by a base station; according to the RRM measurement parameters, performing RRM measurement on multiple beams or all of beams governed by a target beamforming (BF) offloading base station transmit receive point (TRP) and obtaining RRM measurement results; and evaluating the RRM measurement results of the multiple beams or all of beams, and handing over, according to the evaluating result, from a TRP of the source offloading base station with beamforming to the TRP of the target offloading base station with beamforming, or adding additionally the TRP of the target offloading base station with beamforming.

In one implementation mode, the storage medium is further configured to store program codes for executing the following steps:

performing the RRM measurement on the multiple beams or all of beams transmitted by a terminal and obtaining the RRM measurement results; evaluating the RRM measurement results of the multiple beams or all of beams; instructing, according to the evaluating result, the terminal to hand over from the TRP of the source offloading base station with beamforming to the TRP of the target offloading base station with beamforming, or adding additionally the TRP of the target offloading base station with beamforming; or according to the evaluating result, adding a TRP of the offloading base station with BF and activating the added TRP; according to the evaluating result, deleting and deactivating a configured TRP of the offloading base station with BF.

Through the embodiments of the present disclosure, radio resource management (RRM) measurement parameters are received, where the RRM measurement parameters are transmitted through radio resource control (RRC) signaling by a base station. According to the RRM measurement parameters, RRM measurement is performed on multiple beams or all of beams governed by a target beamforming (BF) offloading base station transmit receive point (TRP) to obtain RRM measurement results; and the RRM measurement results of the multiple beams or all of the beams are evaluated. According to the evaluating result, a TRP of the source offloading base station with beamforming is handed over to the TRP of the target offloading base station with beamforming, or the TRP of the target offloading base station with beamforming is added additionally. That is, in the embodiments of the present disclosure, multiple beams or all of beams governed by each TRP are taken as RRM measurement granularity, thereby avoiding a poor terminal mobility performance caused by radio resource control measurement evaluation and handover among beamforming base stations using one beam as the RRM measurement granularity, and improving the terminal mobility performance.

Other aspects can be understood after the drawings and detailed description are read and understood.

DETAILED DESCRIPTION

The present application will be described hereinafter in detail through embodiments with reference to the drawings.

It is to be noted that the terms "first", "second" and the like in the description, claims and drawings of the present application are used to distinguish between similar objects and are not necessarily used to describe a particular order or sequence.

Embodiment One

Figure 6:
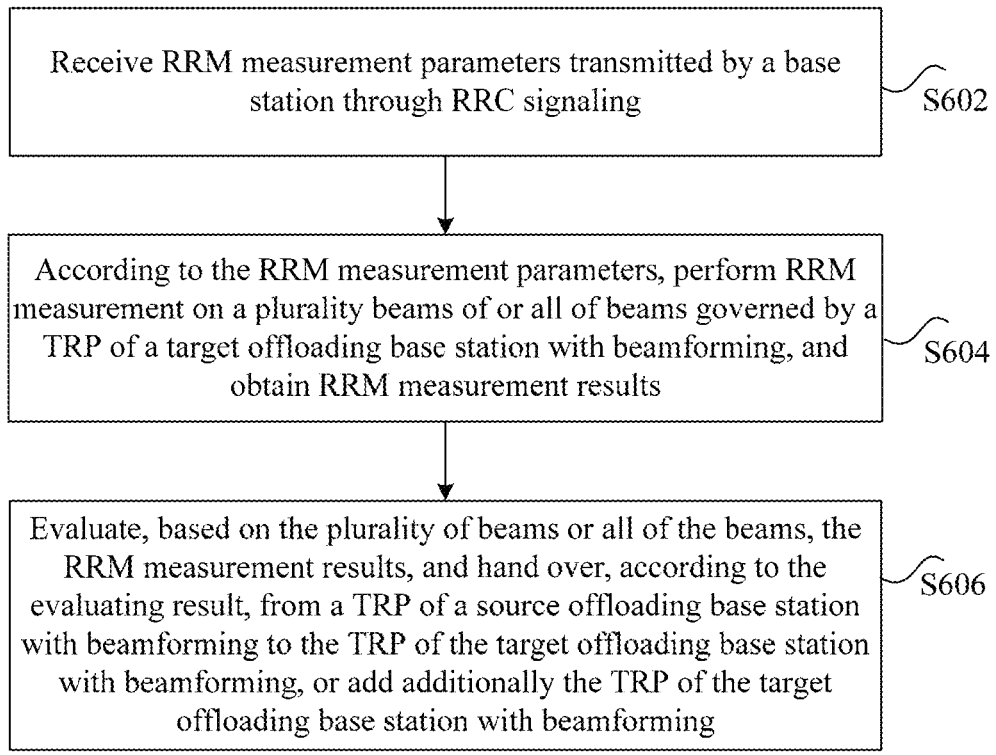
FIG. 6 is a flowchart of a method for managing a radio link according to an embodiment of the present disclosure.

An embodiment of the present disclosure provides a method for managing a radio link. FIG. 6 is a flowchart of the method for managing a radio link according to an embodiment of the present disclosure. As shown in FIG. 6, the process of the method includes the steps described below.

In step S602, radio resource management (RRM) measurement parameters are received. The RRM measurement parameters are transmitted through radio resource control (RRC) signaling by a base station.

In step S604, according to the RRM measurement parameters, RRM measurement is performed on multiple beams or all of beams governed by a transmit receive point (TRP) of a target offloading base station with beamforming (BF) to obtain RRM measurement results.

In step S606, the RRM measurement results are evaluated based on the multiple beams or all of the beams, and according to the evaluating result, a handover is performed from a TRP of a source offloading base station with beamforming to the TRP of the target offloading base station with beamforming, or the TRP of the target offloading base station with beamforming is added additionally.

In one implementation mode, in this embodiment, an application scenario of the above method for managing a radio link includes, but is not limited to, the handover between beamforming base stations based on radio resource management (RRM) measurement evaluation. In this application scenario, UE receives radio resource management (RRM) measurement parameters transmitted through radio resource control (RRC) signaling by a base station; performs RRM measurement on multiple beams or all of beams governed by a target beamforming (BF) offloading base station transmit receive point (TRP) according to the RRM measurement parameters to obtain RRM measurement results; and evaluates, based on the multiple beams or all of the beams, the RRM measurement results, and is handed over from a TRP of the source offloading base station with beamforming to the TRP of the target offloading base station with beamforming according to the evaluating result, or the TRP of the target offloading base station with beamforming is added additionally. That is, in the embodiment, the UE takes multiple beams or all of beams of each TRP as RRM measurement granularity, thereby avoiding a poor mobility performance of the terminal when the terminal performs radio resource control measurement evaluation using one beam as the granularity and is handed over among beamforming base stations, and the terminal mobility performance is improved.

The embodiment will be described below in conjunction with examples.

Figure 1:
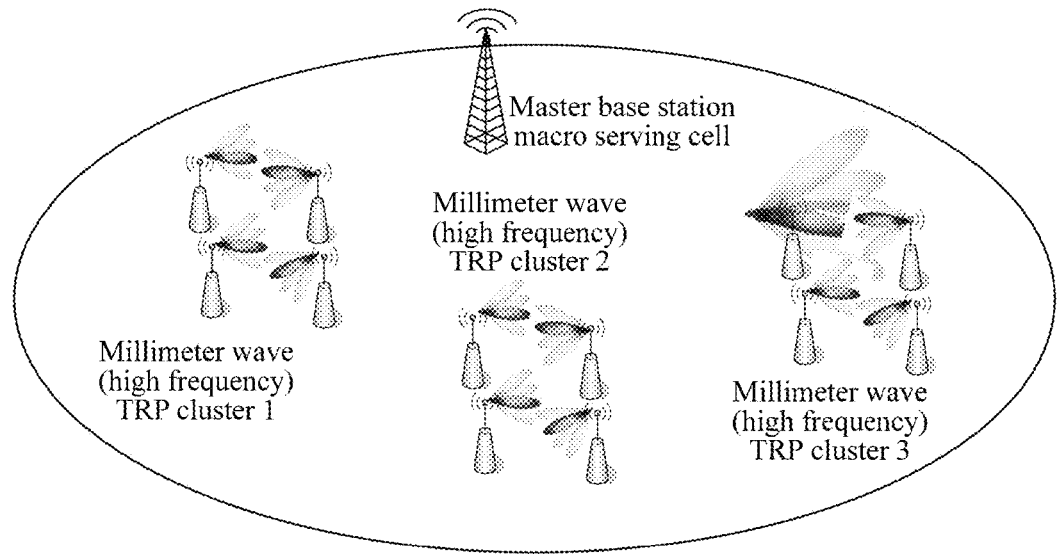
FIG. 1 a schematic diagram of a beamforming operation of a small base station at high frequency.
Figure 2:
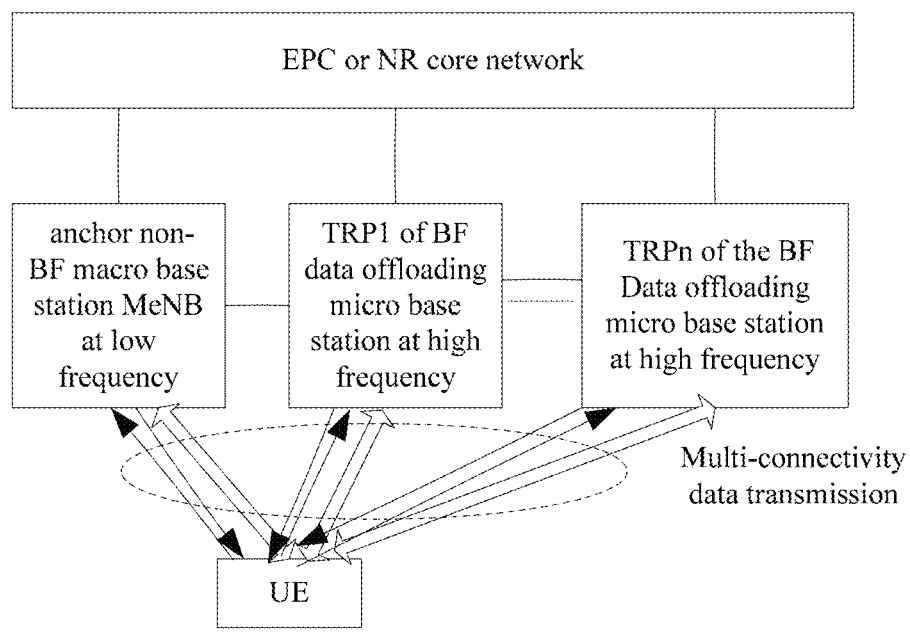
FIG. 2 is a diagram showing an architecture in which a communication base station at high frequency and a communication station at low frequency perform multi-connectivity data transmission by tightly coupling.
Figure 3:
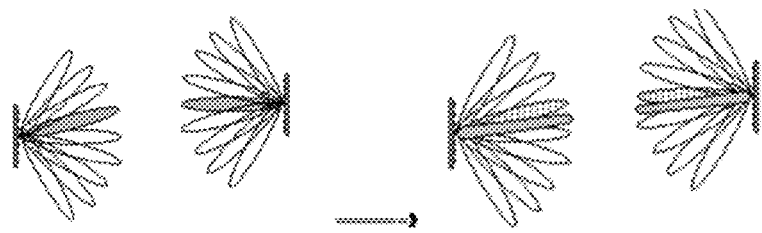
FIG. 3 is a schematic diagram of "rough synchronization training" and "fine synchronization training"
Figure 4:
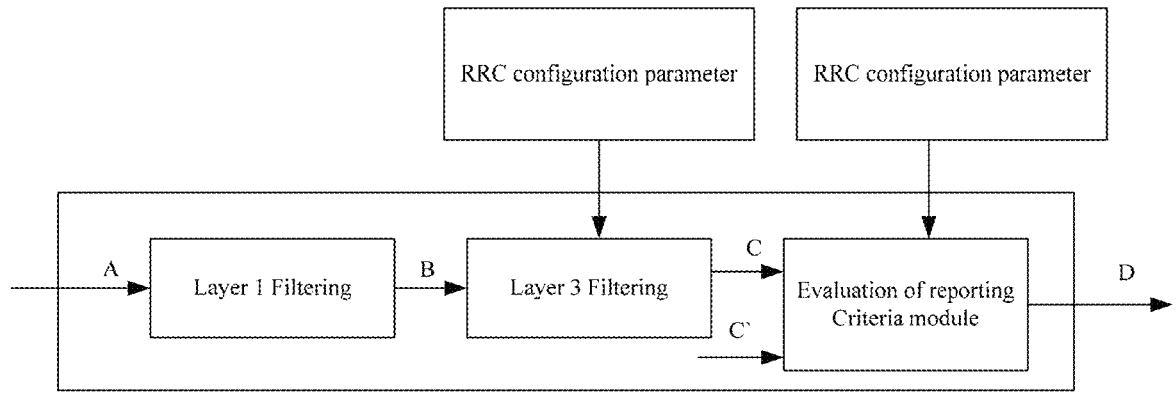
FIG. 4 is a schematic diagram showing an LTE RRM measurement evaluation model.
Figure 5:
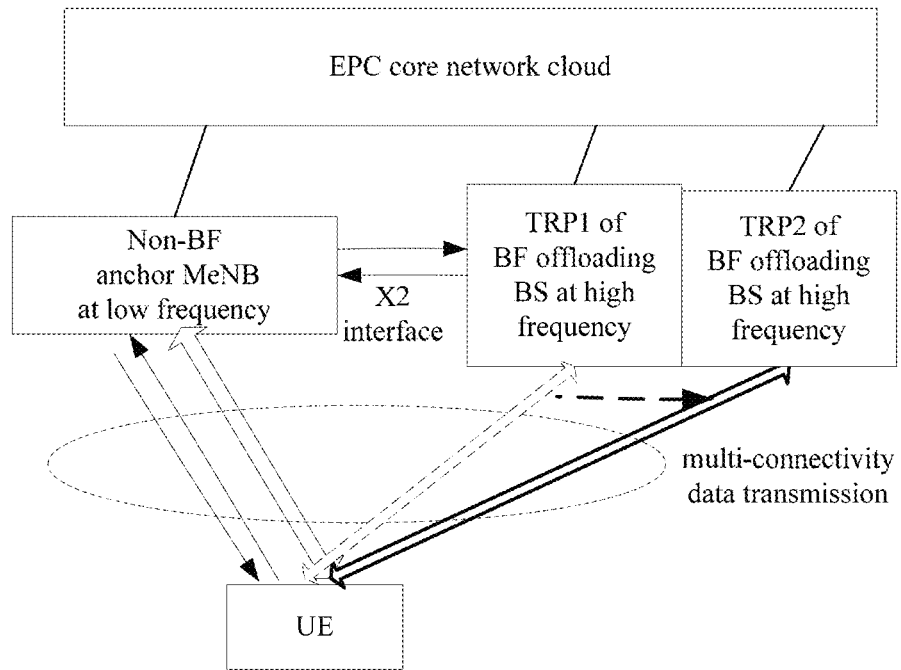
FIG. 5 is a diagram showing a UE in a dual-connectivity data transmission being handed over between a source TRP and a target TRP.

The main scenario of this embodiment is shown in FIG. 2. The UE and a non-beamforming master anchor base station (MeNB or NR base station) have already established a RRC signaling connection SRB and several user plane data bearer DRB (s). The master anchor base station and several TRPs of the offloading base station nodes in a BF mode (mainly in the high frequency deployment, but not excluding a case where the BF operation is performed by a middle-low frequency base station) are connected to each other over a standardized interface (which may be an LTE X2 or NR Xnew interface) between communication base stations. So the uplink and downlink bypass user data offloading and parallel multi-connection data transmission can be applied to DRB(s) user data.

Before the UE establishes a radio link (RL) with any TRP of the offloading base station with BF (i.e., not entering in the multi-connectivity data transmission mode) the master anchor base station configures related measurement parameters to the UE through RRC signaling, the UE performs, based on these parameters, downlink spatial/time-frequency tracking and synchronization as well as downlink RRM measurement on all of or multiple beams (>1) governed by the TRP of the target offloading base station with beamforming, namely, the UE firstly performs downlink spatial/time-frequency synchronization training and downlink time-frequency synchronization attempt on the beams. Through a downlink beam training, the UE tries to find the best transmitting angle of the common downlink channel/signal (including a downlink spatial/time-frequency synchronization training signal, a BRS pilot signal and a system broadcast message signal) of the target TRP and the best receiving angle of the UE itself, then performs the downlink RRM measurement and obtains the accurate RRM measurement result of each target serving beam.

Figure 7:
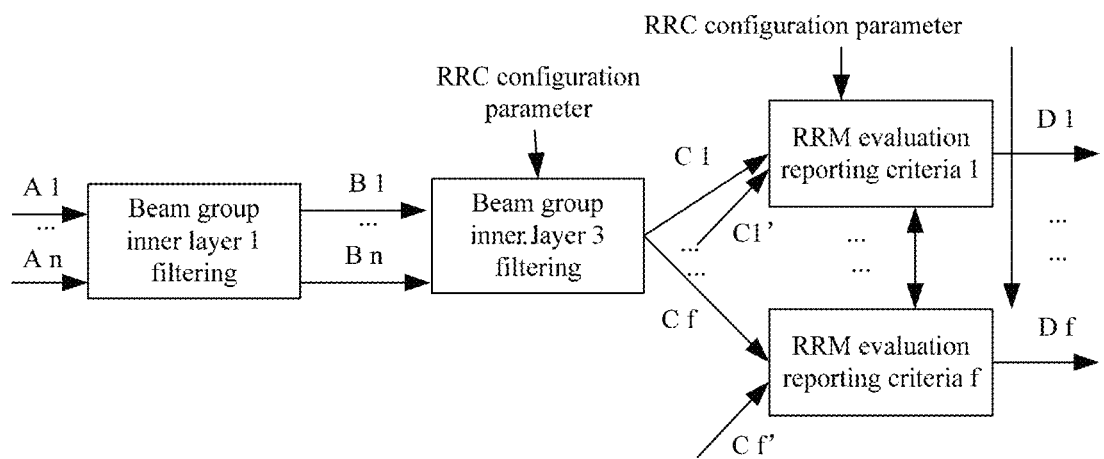
FIG. 7 is a schematic diagram of RRM measurement evaluation model according to an embodiment of the present disclosure.

The UE records the RRM measurement result (such as the signal strength or quality of BRS pilot) corresponding to each target serving beam, and then performs an evaluation operation according to a new RRM measurement evaluation model in FIG. 7 in the embodiment of the present disclosure. The operation includes:

A1 . . . An are initial measurement sampling values of multiple beams Beam1 . . . Beam n governed by the same TRP, the initial measurement sampling values are measured by the UE (these values may be measured by the UE in a BF desynchronization substate and/or BF rough/fine synchronization substate, so some values are reliable and accurate and some are unreliable and inaccurate). B1 . . . Bn are intermediate measurement sampling values obtained by the UE through filtering A1 . . . An in a sampling period using Layer 1 Filtering module layer 1 (at this point, some unreliable and inaccurate sampling values may be filtered out). C1 . . . Cf are dynamic analysis evaluation values obtained by the UE in a certain sampling period through filtering using Layer 3 Filtering module layer 3. The filtration algorithm of this layer 3 may perform various mathematic processing with different input weights on the inputted B1 . . . Bn values in different predefined manners to reflect overall comprehensive evaluation values corresponding to Beam1 . . . Beam n (such as a weighted average strength or quality value for the sampling results of the BRS pilot signal). C1 . . . Cf correspond to overall comprehensive RRM evaluation results obtained by adopting different filtration processing algorithms of the layer 3. C1' . . . Cf are comparative analysis evaluation values (having a same measurement evaluation dimension with C). D1 . . . Df are RRM evaluation result values reported by the UE in a measurement report (MR) message, such as various predefined RRM events. In the new RRM measurement model in the embodiment of the present disclosure, the behavior and the manner of using parameter of the layer 3 filtration processing module and the evaluation of reporting criteria module may be standardized by the NR new air interface protocol. Related configuration parameters are from configuration signaling in a RRC air interface message.

The future NR new protocol may define multiple RRM measurement events for handovers for mobility with different purposes. For example, the "Event NR-A1" event represents: the UE compares a measurement result (processed through the layer 3 filtering) of arithmetic average of the reference signal receiving power (RSRP) or reference signal receiving quality (RSRQ) of all beams of or multiple beams (>1) governed by the TRP of the target offloading base station with beamforming with a threshold value "Thresh" configured by the master anchor base station through RRC air interface signaling, the measurement result is much better than the "Thresh" by the Hysteresis offset value Hys and such a condition lasts exceeding an event trigger period "time to trigger (TTT)". In this way, the UE triggers the local generation of the NR-A1 event, and reports the local generation of the NR-A1 event to the master anchor base station through the MR. Otherwise, the NR-A1 event cannot be generated. For another example, the "Event NR-A2" event represents: the UE compares a measurement result (processed by the layer 3 filtering) of average RSRP and RSRQ of all beams of or multiple beams (>1) governed by the TRP of the target offloading base station with beamforming with the measurement result of average RSRP and RSRQ of all beams of or multiple beams (>1) governed by the TRP of the source offloading base station with beamforming, the measurement result of the TRP of the target offloading base station with beamforming is much better than and greater than the measurement result of the TRP of the source offloading base station with beamforming by a configured Hysteresis offset value Hys, and such a condition lasts exceeding an event trigger period "time to trigger (TTT)". The UE triggers the local generation of the NR-A2 event, and reports the NR-A2 event to the master anchor base station through the MR, otherwise the NR-A2 event cannot be generated. The meanings of other various events may be predefined by the NR new protocol according to needs.

The above new RRM measurement model and definition have the following characteristics: a certain type of RRM measurement event is associated with all of or multiple of serving beams (>1) governed by a TRP and/or be associated with all of or multiple of serving beams (>1) governed by another TRP, and multiple times of RRM measurement based on "one set of n beams" and "another set of m beams" are generated, each of which is generated by performing RRM measurement, filtering and comparative evaluation on m beams, and multiple parallel RRM event results can be generated at the same time by using different filtration algorithms in the layer 3 filtering for a comprehensive reference of mobility determination of the master anchor base station, thereby reasonably opening, updating and stopping the UE multi-connectivity data transmission, and learning an overall situation of the radio signal coverage strength/quality of the served UE and the TRP side of the BF offloading base station which is tight coupled with the served UE.

In one embodiment, the process of jointly evaluating, based on the multiple beams or all of the beams, the RRM measurement results includes the steps described below.

In step S11, the RRM measurement results corresponding to the multiple beams or all of the beams governed by the TRP of the target offloading base station with beamforming are acquired.

In step S12, the acquired RRM measurement results are jointly evaluated according to a predetermined RRM measurement result evaluation model.

Through the steps S11 and S12 described above, the acquired RRM measurement results corresponding to the multiple of or all of the beams are jointly evaluated according to the predetermined RRM measurement result evaluation model, so that the UE is can be added or handed over to a target TRP with better overall radio coverage service quality.

In one embodiment, the process of jointly evaluating, according to the predetermined RRM measurement result evaluation model, the acquired RRM measurement results includes the steps described below.

In step S21, the RRM measurement results corresponding to the multiple of or all of the beams governed by the TRP of the target offloading base station with beamforming are taken as parallel initial measurement sampling values.

In step S22, according to a predetermined sampling period, the initial measurement sampling values are filtered concurrently to obtain parallel intermediate measurement sampling values.

In step S23, a weighted average processing is performed on the parallel intermediate measurement sampling values in a predefined manner to obtain one joint evaluation value outputted serially, and the joint evaluation value is evaluated by comparing the joint evaluation value with a comparative analysis evaluation value according to a preset inequality rule to obtain a comparative evaluation result. The joint evaluation value and the comparative analysis evaluation value have a same measurement evaluation dimension.

Through the steps S21 to S23 described above, the joint evaluation value outputted serially is obtained, so that the UE can be added or handed over to a target TRP with better overall radio coverage service quality.

In one embodiment, after obtaining the joint evaluation value and the comparative evaluation result, the method further includes the following steps.

In step S31, according to a RRM measurement result evaluation reporting rule, the joint evaluation value and the comparative evaluation result are reported.

In one embodiment, the process of reporting, according to the RRM measurement result evaluation reporting rule, the joint evaluation value and the comparative evaluation result includes the steps described below.

In step S41, whether the joint evaluation value and the comparative evaluation result satisfy a predefined RRM measurement event is determined. The RRM measurement event is defined by standards of an air interface protocol of a new radio (NR) access system.

In step S42, in response to that the joint evaluation value and the comparative evaluation result satisfy the predefined RRM measurement event or a preset condition set is satisfied, the evaluation result is reported through a measurement report over an air interface between a terminal and a master anchor base station.

Through the steps S41 and S42 described above, in response to determining that the joint evaluation value and the comparative evaluation result satisfy the predefined RRM measurement event, the evaluation result is reported through the measurement report over the air interface between the terminal and the master anchor base station, so that the base station can perform some pre-configuration operations.

In one embodiment, the above RRM measurement event is associated with multiple of or all of beams governed by a TRP and/or associated with multiple of or all of beams governed by another TRP, such that multiple parallel RRM measurement sampling results are generated after the RRM measurement.

The embodiment will be described below in conjunction with the examples.

Embodiment One

Figure 8:
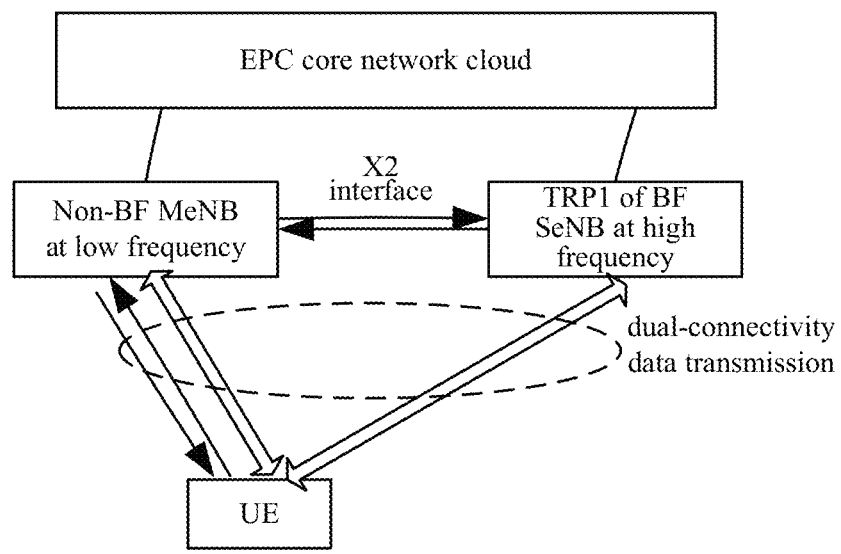
FIG. 8 is a diagram showing a UE in a dual-connectivity data transmission being handed over between a source TRP and a target TRP according to an embodiment of the present disclosure.

As shown in FIG. 8, UE is originally in a single-connectivity data transmission mode with an MeNB. Later, since the UE moves into the coverage of a TRP1, the TRP1 is added to the configuration of the UE, the UE enters a dual-connectivity data transmission state with the MeNB and TRP 1.

The FIG. 8 is described below.

An operator deploys and utilizes high-low frequency tight coupling to perform a dual-connectivity (DC) operation. A certain licensed carrier where a master anchor base station MeNB at low frequency is located is covered by a serving macro cell of a Pcell, and is connected to a TRP node of a remote high frequency offloading base station SeNB over an X2 interface. A TRP1 and four severing beams governed by the TRP1 are deployed on a certain high frequency licensed carrier where the SeNB node is located for hotspot capacity enhancement.

At the beginning, the UE is only under the coverage of the Pcell, so the UE is in single-connectivity state with the MeNB.

With the movement of the UE, the UE gradually approaches a common coverage area of the Pcell and the beams of the TRP "TRP-Beams", so that the MeNB decides to configure the measurement parameter associated with a high frequency target serving TRP1 node for the UE, and enables the UE to perform downlink RRM measurement on the target TRP1-Beams. By default, the UE needs to perform a downlink spatial/time-frequency tracking synchronization attempt on the target TRP1-Beams. A non-beamforming MeNB node at low frequency, a BF SeNB-TRP1 node at high frequency and the UE all support the content of the embodiment of the present disclosure. The implementation steps of the embodiment of the present disclosure are described below.

In step 101, the master anchor base station MeNB configures the RRC message "RRC connection reconfiguration" to the UE, such that the UE searches for beams of the high frequency target TRP 1 nodes, performs training and tracking, and performs downlink RRM measurement on multiple beams according to the mode provided in the present disclosure. A predefined event "Event NR-A1" is: the UE measures the arithmetical average reference signal receiving power (RSRP) and reference signal receiving quality (RSRQ) of all beams of or multiple beams (>1) governed by the TRP of the target offloading base station with beamforming to obtain a measurement result (processed by the layer 3 filtering) of the TRP of the target offloading base station with beamforming, the measurement result of the TRP of the target offloading base station with beamforming is compared with the threshold value "Thresh" configured by the master anchor base station through RRC air interface signaling, the measurement result of the TRP of the source offloading base station with beamforming is better than the threshold value "Thresh" by a configured Hysteresis offset value Hys, and such a condition lasts exceeding an event trigger time "time to trigger (TTT)". In this case, the UE triggers the local generation of the NR-A1 event, and reports the local generation of the NR-A1 event to the master anchor base station through the measurement report (MR) message.

In step 102, the UE performs Beams tracking synchronization and measurement based on RRM measurement parameters configured by the MeNB, and performs Beam training and tracking on a downlink common synchronization signal transmitted through four Beams governed by the TRP1. After performing the synchronization training for a period of time, the UE obtains a downlink "BF fine synchronization substate" with a best beam, i.e., Beam1. At the same time, the UE performs the downlink RRM measurement through a downlink common pilot signal transmitted through the beams governed by the TRP1. After performing the measurement for a time window, the UE obtains the downlink RRM measurement results of the best Beam1 with which the synchronization has been established and other beams 2/3/4 governed by the TRP1.

In step 103, according to the new RRM evaluation model in the embodiments of the present disclosure, the UE performs the layer 1 filtering on the initial RRM measurement sampling values of the serving beams 1, 2, 3, 4 with which the tracking and synchronization have been established to obtain the intermediate measurement sampling values; next, the UE performs the layer 3 filtering on these intermediate measurement sampling values to obtain the dynamic analysis evaluation values; next, the UE performs the arithmetic average process on the dynamic analysis evaluation values corresponding to the beams 1, 2, 3, 4 to obtain the overall comprehensive evaluation value of TRP 1. In a TTT measurement window, if the overall comprehensive evaluation value of the TRP1>a comparative analysis evaluation value "Thresh"+the Hysteresis offset value Hys, the NR-A1 event is triggered. The UE then reports the NR-A1 event to the MeNB through a RRC message "Measurement Report". The content of the RRC message may also include: the downlink "BF fine synchronization substate" of the UE and the best Beam1, and the downlink RRM measurement result of the best Beam1 governed by the TRP1.

In step 104: The MeNB learns, based on the result reported by the UE, that the UE is already in the downlink "BF fine synchronization substate" with the TRP1-Beam1 and overall comprehensive quality of the TRP1 meets a preset condition requirement, and determines to establish the high-low frequency dual-connectivity (DC) operation for the served UE and the SeNB-TRP1, thereby establishing a RL on the TRP1-Beam1 and continuing to perform offloading transmission of uplink and downlink data blocks according a similar existing establishment process of the dual-connectivity operation in the LTE.

In step 105: the SeNB receives, from the MeNB, over an X2 interface, a high-low frequency DC operation addition request message "SeNB Addition Request" and configuration information associated with the establishment of the target RL. The SeNB can determin that the TRP1 also has implemented an uplink "BF fine synchronization substate" with the served UE on the Beam1 and uplink RRM measurement results are good. Therefore, the SeNB feeds back a "SeNB Addition Request Ack" message to the MeNB over the X2 interface, agrees to establish a high-low DC, and agrees to establish the RL on the TRP1-Beam1.

In step 106: the MeNB configures the RRC message "RRC connection reconfiguration" to the UE for a high-low frequency tight coupling DC operation, and then the UE may perform uplink and downlink user traffic data transmission on radio links MeNB-RL and SeNB-TRP1-RL at the same time.

Embodiment Two

Figure 9:
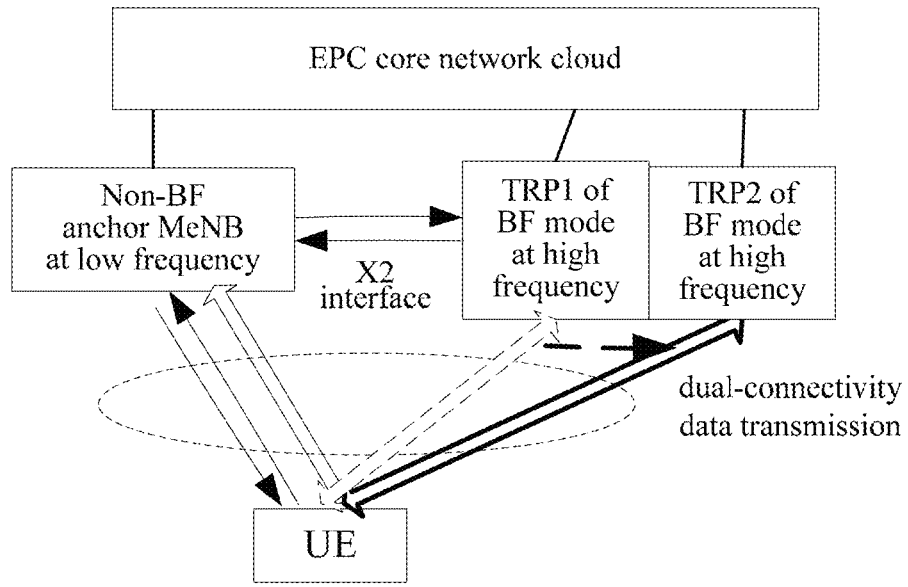
FIG. 9 is a diagram showing another UE in a dual-connectivity data transmission being handed over between a source TRP and a target TRP according to an embodiment of the present disclosure.

As shown in FIG. 9, UE is originally in a dual-connectivity data transmission state with an MeNB and a certain source Beam of a TRP 1. Later, due to the movement of the UE, the UE is handed over to another dual-connectivity data transmission state with the MeNB and a certain Beam of a TRP 2.

The FIG. 9 is described below.

An operator deploys and utilizes high-low frequency tight coupling to perform a dual-connectivity (DC) operation. A certain licensed carrier where a low frequency master anchor base station MeNB is located is covered by a serving macro cell of a Pcell, and is connected to two nodes TRP1 and TRP2 of a remote high frequency offloading base station SeNB over an X2 interface. A certain high frequency licensed carrier where the SeNB node is located has a TRP1 and a TRP2. Each of the TRP1 and TRP2 governs four severing beams for hotspot capacity enhancement.

Initially, the UE is under the coverage of the Pcell and the coverage of the TRP1, so the UE is in the dual-connectivity state with the MeNB and TRP1. With the movement of the UE, the UE gradually leaves the coverage area of the TRP1-Beams and approaches a common coverage area of the Pcell and the TRP2-Beams, so that the MeNB decides to configure relevant measurement parameters of a high frequency target serving TRP2 node for the UE, and enables the UE to perform downlink RRM measurement on a target TRP2-Beams. In addition to maintain a downlink spatial/time-frequency tracking and synchronization on a source TRP1-Beams by default, the UE also needs to perform a downlink spatial/time-frequency tracking and synchronization attempt on the target TRP2-Beams. The non-BF low frequency node MeNB, the BF high frequency nodes SeNB-TRP1/2 and the UE all support the content of the embodiment of the present disclosure. The implementation steps of the embodiment of the present disclosure are described below.

In step 201, the master anchor base station MeNB sends RRC message "RRC connection reconfiguration" to the UE, such that the UE searches for beams of the high frequency target TRP 1/2 nodes, performs training and tracking, and performs downlink RRM measurement of multiple beams according to the mode provided in the present disclosure. A predefined event "Event NR-A2" is: the UE measures the average RSRP or average RSRQ of all beams of or multiple beams (>1) governed by the TRP of the target offloading base station with beamforming and the average RSRP or average RSRQ of all beams of or multiple beams (>1) governed by the TRP of the source offloading base station with beamforming to obtain a measurement result (processed by the layer 3 filtering) of the TRP of the target offloading base station with beamforming and a measurement result of the TRP of the source offloading base station with beamforming, the measurement result of the TRP of the target offloading base station with beamforming is compared with the measurement result of the TRP of the source offloading base station with beamforming, and the measurement result of the TRP of the target offloading base station with beamforming is better than the measurement result of the TRP of the source offloading base station with beamforming by a configured Hysteresis offset value Hys, and such a condition lasts exceeding an event trigger time "time to trigger (TTT)". In this case, the UE triggers the local generation of the NR-A2 event, and reports the NR-A2 to the master anchor base station through the measurement report (MR) message.

In step 202, the UE performs Beams tracking synchronization and measurement based on RRM measurement parameters configured by the MeNB, and performs beam training and tracking through a downlink common synchronization signal transmitted by the TRP2 through the four Beams of the TRP2 After performing the synchronization training for a period of time, the UE obtains a downlink "BF fine synchronization substate" with a best beam, i.e., TRP2-Beam2. At the same time, the UE performs the downlink RRM measurement on a downlink common pilot signal transmitted by the beams governed by the TRP2. After performing the downlink RRM measurement for a time window, the UE obtains the downlink RRM measurement results of the best TRP2-Beam2 with which the synchronization has been established and other beams 2, 3, 4 governed by the TRP2.

In step 203, according to the new RRM evaluation model in the embodiments of the present disclosure, the UE performs the layer 1 filtering on the initial RRM measurement sampling values of the beams 1, 2, 3, 4 of the TRP1/2 with which the tracking and synchronization have been established to obtain the intermediate measurement sampling values of the beams 1, 2, 3, 4 of the TRP1/2; next, the UE performs the layer 3 filtering on these intermediate measurement sampling values to obtain the dynamic analysis evaluation values of the beams 1, 2, 3, 4; next, the UE performs the arithmetic average process on the dynamic analysis evaluation values corresponding to the beams 1, 2, 3, 4 to obtain the overall comprehensive evaluation value of TRP 1 and the overall comprehensive evaluation value of TRP 2. In a TTT measurement window, if the overall comprehensive evaluation value of the TRP2 is greater than the overall comprehensive evaluation value of the TRP1 plus the Hysteresis offset value Hys, the NR-A1 event is triggered. The UE then reports the NR-A2 event to the MeNB through a RRC message "Measurement Report". The content of the RRC message may also include: the downlink "BF fine synchronization substate" of the UE and the best target TRP2-Beam2, and the downlink RRM measurement result of the best Beam2 governed by the TRP2.

In step 204: the MeNB learns, based on the result reported by the UE, that the UE is already in the downlink "BF fine synchronization substate" with the target TRP2-Beam2 and the overall comprehensive quality of the TRP2 meets a preset condition requirement, and determines to establish a high-low frequency dual-connectivity (DC) operation for the served UE and the SeNB-TRP2, and delete the old RL established between the UE and the source TRP1, thereby establishing a new RL on the TRP2-Beam2 and continuing to perform offloading transmission of uplink and downlink data blocks according to a similar existing establishment process of the dual-connectivity operation in the LTE.

In step 205: the SeNB receives, from the MeNB and over an X2 interface, a dual-connectivity operation modification request message "SeNB Modification Request" and configuration information associated with the establishment of the target new RL. The SeNB can determine that the TRP2 also has implemented an uplink "BF fine synchronization substate" with the served UE on the Beam2 and uplink RRM measurement results are good. Therefore, the SeNB feeds back a "SeNB Modification Request Ack" message to the MeNB over the X2 interface, agrees to perform high-low DC modification operation, and agrees to establish the new RL on the TRP2-Beam2.

In step 206: the MeNB sends the RRC message "RRC connection reconfiguration" to the UE for the high-low frequency tight coupling DC operation, and then the UE may continue to perform uplink and downlink user traffic data transmission on radio links MeNB-RL and SeNB-TRP2-RL. The original SeNB-TRP1-RL is deleted and cannot be used for data offloading transmission.

Embodiment Three

Figure 10:
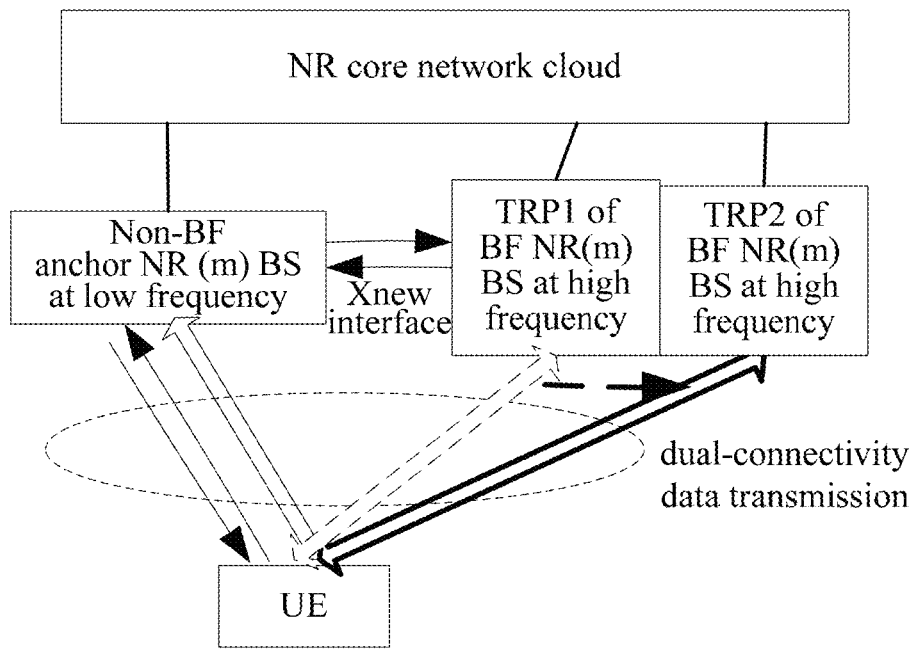
FIG. 10 is a diagram showing yet another UE in a dual-connectivity data transmission being handed over between a source TRP and a target TRP according to an embodiment of the present disclosure.

As shown in FIG. 10, UE is originally in a dual-connectivity data transmission state with a NR(m) BS and a certain Beam of a TRP 1. Later, due to the movement of the UE, the UE is switched to another dual-connectivity data transmission state with the NR (m)BS and a certain Beam of a TRP 2.

The FIG. 10 is described below.

An operator deploys and utilizes high-low frequency tight coupling to perform a dual-connectivity (DC) operation. A certain licensed carrier where a low frequency master anchor base station NR (m) BS is located is covered by a serving macro cell of a Pcell, and is connected to two remote nodes: a TRP1 of the NR (s)BS offloading base station at high frequency and a TRP2 of the NR (s)BS offloading base station at high frequency over an Xnew interface. A certain high frequency licensed carrier where the NR (s)BS nodes are located has a TRP1 and a TRP2. Each of TRP1 and TRP2 governs four severing beams for hotspot capacity enhancement.

Initially, the UE is under the joint coverage of the Pcell and the TRP1, so UE is in dual-connectivity with the NR (m) BS and the TRP1. With the movement of the UE, the UE gradually gets away the coverage area of the TRP1-Beams and approaches a common coverage area of the Pcell and the TRP2-Beams, so that the NR (m)BS decides to configure relevant measurement parameters of a high frequency target serving TRP2 node for the UE, and enables the UE to perform downlink RRM measurement on a target TRP2-Beams, and the UE also needs to perform a downlink spatial/time-frequency tracking synchronization attempt on the target TRP2-Beams in addition to the default downlink spatial/time-frequency tracking synchronization on a source TRP1-Beams. A non-beamforming low frequency NR (m)BS node, BF high frequency SeNB-TRP1/2 nodes and the UE all support the content capability of the embodiment of the present disclosure. The implementation steps of the embodiment of the present disclosure are described below.

In step 301, the master anchor base station NR (m)BS sends the RRC message "RRC connection reconfiguration" to the UE, such that the UE searches for beams of the high frequency target TRP 1/2 nodes, performs training, tracking and downlink RRM measurement on multiple beams according to the mode in the embodiment of the present disclosure. A predefined even "Event NR-A3" is: the UE measures the average RSRP and average RSRQ of all beams of or multiple beams (>1) governed by the TRP of the target offloading base station with beamforming, the measurement result (processed by the layer 3 filtering) is better than a certain configuration threshold Thresh1 and is greater than the configured Hysteresis offset value Hys1, at the same time, a measurement result of average RSRP and average RSRQ of all beams of or multiple beams (>1) governed by the TRP of source offloading base station with beamforming is worse than another certain configuration threshold Thresh2 and is greater than the configured Hysteresis offset value Hys2, and the measurement results each lasts exceeding a respective event trigger period "time to trigger (TTT)", such that the UE triggers the local generation of the NR-A3 event, and reports NR-A3 event to the master anchor base station through the measurement report (MR) message.

In step 302, the UE performs beams tracking synchronization and measurement based on RRM measurement parameters configured by the NR (m) BS, and performs beam training and tracking through a downlink common synchronization signal transmitted by four beams governed by the TRP1/TRP2. After performing synchronization training for a period, the UE obtains a downlink "BF fine synchronization substate" with a best beam TRP2-Beam3. At the same time, the UE performs the downlink RRM measurement through a downlink common pilot signal transmitted by the beams governed by the TRP1/the TRP2. After performing measurement for a time window, the UE obtains the downlink RRM measurement results of the best beam TRP2-Beam3 with which the synchronization is established and other beams 1/2/4 governed by the TRP2.

In step 303, according to the new RRM evaluation model in the embodiment of the present disclosure, the UE performs the layer 1 filtering on the initial RRM measurement sampling values of the beams 1, 2, 3, 4 of the TRP1/2 with which the tracking and synchronization have been established to obtain the intermediate measurement sampling values of the beams 1, 2, 3, 4 of the TRP1/2; next, the UE performs the layer 3 filtering on these intermediate measurement sampling values to obtain the dynamic analysis evaluation values of the beams 1, 2, 3, 4; next, the UE performs the weighted average process (different weights for different beams) on the dynamic analysis evaluation values corresponding to the beams 1, 2, 3, 4 to obtain the overall comprehensive evaluation value of TRP 1 and the overall comprehensive evaluation value of TRP 2. In a TTT measurement window, if the overall comprehensive evaluation value of the TRP2 is greater than a threshold Thresh1 plus the hysteresis offset value Hys, at the same time, the overall comprehensive evaluation value of the TRP1 is less than a threshold Thresh2 minus the hysteresis offset value Hys2, the NR-A3 event is triggered. The UE then reports the NR-A3 event to the NR (m)BS through a RRC message "Measurement Report". The content of the RRC message may also include: the downlink "BF fine synchronization substate" of the UE and the best target TRP2-Beam3, and the downlink RRM measurement result of the best Beam3 governed by the TRP2.

In step 304: The NR(m)BS learns, based on the result reported by the UE, that the UE is already in the downlink "BF fine synchronization substate" with the TRP2-Beam3 and the overall comprehensive qualities of the TRP1 and the TRP2 meet a preset condition requirement, and determines to establish high-low frequency dual-connectivity (DC) operation for the served UE and the NR (s)BS-TRP2, and delete the old RL established between the source TRP1 and the UE, such that the NR(m) BS establishes a new RL on the TRP2-Beam3 and continuing to perform offloading transmission of uplink and downlink data blocks according to a NR dual-connectivity operation modification process.

In step 305: the NR(s) BS receives, from the NR (m) BS over an Xnew interface, a high-low frequency dual-connectivity operation modification request message "NR BS Modification Request" and configuration information associated with the establishment of the target new RL. The NR(s) BS can determine that the TRP2 also has implemented an uplink "BF fine synchronization substate" with the served UE on the Beam3 and uplink RRM measurement results are good. Therefore, the NR (s) BS feeds back a "NR BS modification request Ack" message to the NR (m) BS over the Xnew interface, agrees to perform high-low frequency DC modification operation, and agrees to establish the new RL on the TRP2-Beam3.

In step 306: the NR (m)BS sends the RRC message "RRC connection reconfiguration" to the UE for the high-low frequency tight coupling DC operation. Hereafter, the UE may continue to perform uplink and downlink user traffic data transmission on radio links NR (m)BS-RL and NR(s) BS-TRP2-RL. The original NR (s) BS-TRP1-RL is deleted and cannot used for data offloading transmission.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on this understanding, the solution provided by the present disclosure may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present disclosure.

Embodiment Two

The embodiment further provides an apparatus for managing a radio link. The apparatus is used for implementing the above-mentioned embodiments and preferred embodiments. What has been described will not be repeated. As used below, the term "module" may be software, hardware or a combination thereof capable of implementing predetermined functions. The apparatus described below in the embodiment may be implemented by software, but implementation by hardware or by a combination of software and hardware is also possible and conceived.

Figure 11:
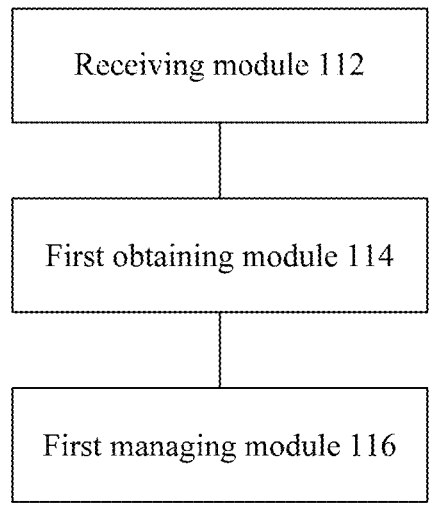
FIG. 11 is a block diagram of an apparatus for managing a radio link according to an embodiment of the present disclosure.

FIG. 11 is a block diagram of an apparatus for managing a radio link according to the embodiment of the present disclosure. As shown in FIG. 11, the apparatus includes: a receiving module 112, a first obtaining module 114 and a first managing module 116.

1) The receiving module 112 is configured to receive RRM measurement parameters transmitted through RRC signaling by a base station.

2) The first obtaining module 114 is configured to perform, according to the RRM measurement parameters, RRM measurement on multiple beams or all of beams governed by a TRP of a target offloading base station with beamforming, and obtain RRM measurement results.

3) The first managing module 116 is configured to jointly evaluate, based on the multiple beams or all of the beams, the RRM measurement results, and hand over, according to the evaluating result, from a TRP of a source offloading base station with beamforming to the TRP of the target offloading base station with beamforming, or add additionally the TRP of the target offloading base station with beamforming.

In the embodiment, an application scenario of the above radio link management apparatus includes, but is not limited to, the handover among beamforming base stations based on the radio resource management (RRM) measurement evaluation. In this application scenario, UE receives RRM measurement parameters transmitted through RRC signaling by a base station; performs according to the RRM measurement parameters RRM measurement on multiple beams or all of beams governed by a TRP of a target offloading base station with beamforming to obtain RRM measurement results; and jointly evaluates the RRM measurement results based on the multiple beams or all of the beams, and is handed over, according to the evaluating result, from a TRP of a source offloading base station with beamforming to the TRP of the target offloading base station with beamforming, or adds additionally the TRP of the target offloading base station with beamforming. That is, in the embodiment, multiple beams or all of beams governed by each TRP are taken as RRM measurement granularity, thereby avoiding a poor terminal mobility performance when the terminal performs the radio resource control measurement evaluation and mobile handover among beamforming base stations, and improving the terminal mobility performance.

Figure 12:
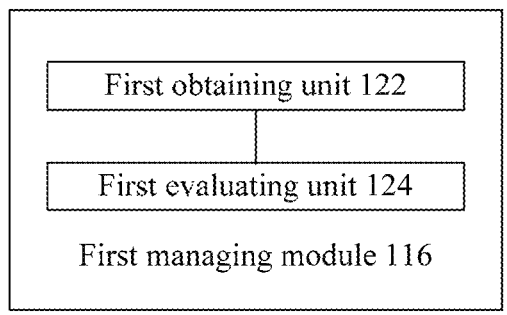
FIG. 12 is a block diagram one of an apparatus for a managing radio link according to an embodiment of the present disclosure.

FIG. 12 is a block diagram one of an apparatus for managing a radio link according to the embodiment of the present disclosure. As shown in FIG. 12, the first managing module 116 includes: a first obtaining unit 122 and a first evaluating unit 124.

1) The first obtaining unit 122 is configured to acquire the RRM measurement results corresponding to the multiple beams or all of beams governed by a TRP of a target offloading base station with beamforming.

2) The first evaluating unit 124 is configured to jointly evaluate, according to a predetermined RRM measurement result evaluation model, the acquired RRM measurement results.

Through the apparatus shown in FIG. 12, the acquired RRM measurement results corresponding to the multiple beams or all of the beams are jointly evaluated according to the predetermined RRM measurement result evaluation model, so that the UE can be added or handed over to a target TRP with better overall and comprehensive radio coverage service quality.

Figure 13:
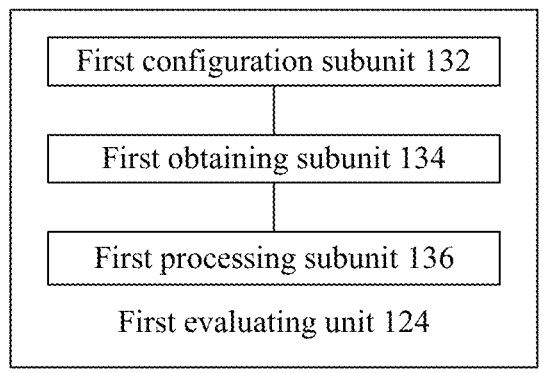
FIG. 13 is a block diagram two of an apparatus for managing a radio link according to an embodiment of the present disclosure.

FIG. 13 is a block diagram two of an apparatus for managing a radio link according to the embodiment of the present disclosure. As shown in FIG. 13, the first evaluating unit 124 includes: a first configuration subunit 132, a first obtaining subunit 134 and a first processing subunit 136.

1) The first configuration subunit 132 is configured to take the RRM measurement results corresponding to the multiple beams or all of the beams governed by the TRP of the target offloading base station with beamforming as parallel initial measurement sampling values.

2) The first obtaining subunit 134 is configured to filter concurrently the initial measurement sampling values according to a predetermined sampling period, and obtain parallel intermediate measurement sampling values.

3) The first processing subunit 136 is configured to perform a weighted average processing on the parallel intermediate measurement sampling values in a predefined manner to obtain one joint evaluation value outputted serially, and evaluate, the joint evaluation value by comparing the joint evaluation value with a comparative analysis evaluation value according to a preset inequality rule to obtain a comparative evaluation result, where the joint evaluation value and the comparative analysis evaluation value have a same measurement evaluation dimension.

Through the apparatus shown in FIG. 13, the joint evaluation value outputted serially is obtained, so that the UE can be added or handed over to a target TRP with better overall and comprehensive radio coverage service quality.

Figure 14:
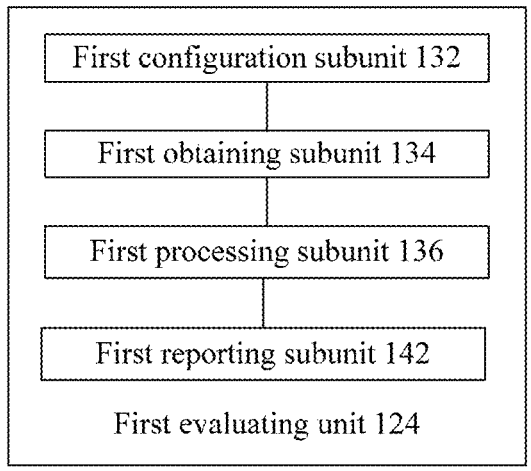
FIG. 14 is a block diagram three of an apparatus for managing a radio link according to an embodiment of the present disclosure.

FIG. 14 is a block diagram three of an apparatus for managing a radio link according to the embodiment of the present disclosure. As shown in FIG. 14, the first evaluating unit 124 includes: a first reporting subunit 142.

1) The first reporting subunit 142 is configured to report, after obtaining the joint evaluation value and the comparative evaluation result, the joint evaluation value and the comparative evaluation result according to the RRM measurement result evaluation reporting criteria.

Figure 15:
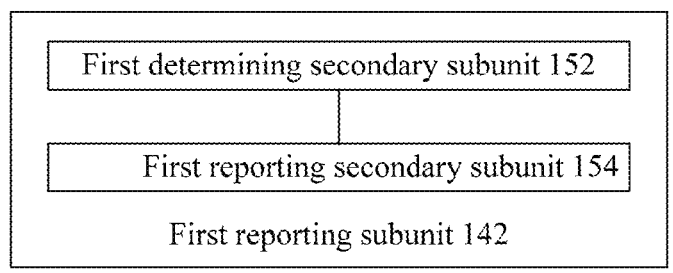
FIG. 15 is a block diagram four of an apparatus for managing radio link according to an embodiment of the present disclosure.

FIG. 15 is a block diagram four of an apparatus for managing a radio link according to the embodiment of the present disclosure. As shown in FIG. 15, the first reporting subunit 142 includes: a first determining secondary subunit 152 and a first reporting secondary subunit 154.

1) The first determining secondary subunit 152 is configured to determine whether the joint evaluation value and the comparative evaluation result satisfy a predefined RRM measurement event, where the RRM measurement event is an event defined by standards of an air interface protocol of a new radio (NR) access system.

2) The first reporting secondary subunit 154 is configured to report, in response to that the joint evaluation value and the comparative evaluation result satisfy the predefined RRM measurement event or a preset condition set is satisfied, the evaluation result through a measurement report over an air interface between a terminal and a master anchor base station.

Through the apparatus shown in FIG. 15, in response to determining that the joint evaluation value and the comparative evaluation result satisfy the predefined RRM measurement event, the evaluation result is reported through the measurement report over the air interface between the terminal and the master anchor base station, so that the base station can perform some pre-configuration operations.

In one implementation mode, the RRM measurement event is associated with multiple beams or all of beams governed by a TRP, and/or the RRM measurement event is associated with the multiple or all of beams governed by another TRP, such that multiple parallel RRM measurement sampling results are generated after the RRM measurement.

It is to be noted that the various modules described above may be implemented by software or hardware. Implementation by hardware may, but not necessarily, be performed in the following manner: the various modules described above are located in a same processor, or the various modules described above are located in different processors in any combination form.

Embodiment Three

Figure 16:
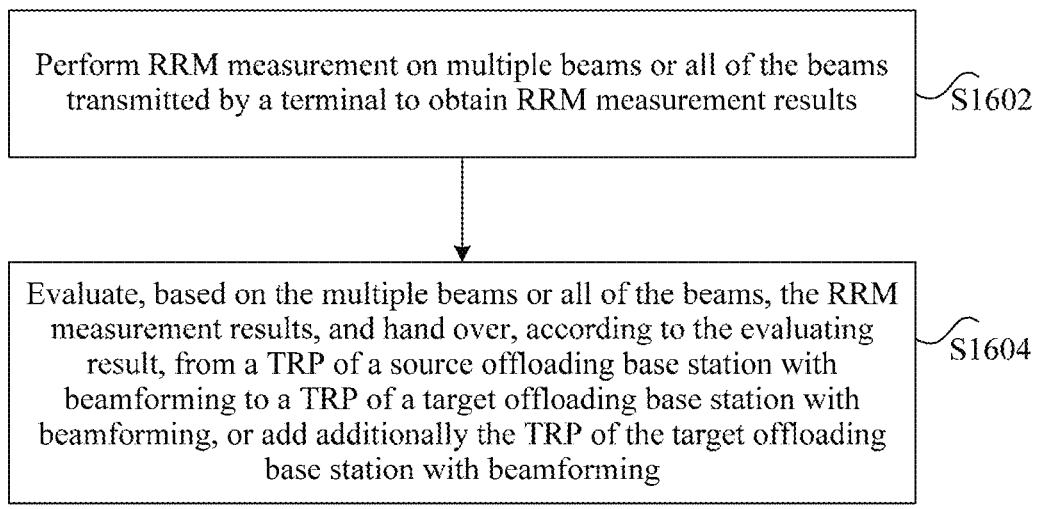
FIG. 16 is a flowchart of another method for managing a radio link according to an embodiment of the present disclosure.

An embodiment of the present disclosure further provides a method for managing a radio link. FIG. 16 is a flowchart of another method for managing a radio link according to an embodiment of the present disclosure. As shown in FIG. 16, the method includes the steps described below.

In step S1602, RRM measurement is performed on multiple beams or all of beams transmitted by a terminal and RRM measurement results are obtained.

In step S1604, based on the multiple or all of the beams, the RRM measurement results are jointly evaluated, and according to the evaluating result, the terminal is instructed to be handed over from a TRP of a source offloading base station with beamforming to the TRP of the target offloading base station with beamforming, or the TRP of the target offloading base station with beamforming is added additionally.

According to the evaluating result, a TRP of a offloading base station with BF is added, and the added TRP are activated. Alternatively, according to the evaluating result, a deactivated and configured TRP of the offloading base station with BF is deleted.

In the embodiment, an application scenario of the above radio link management method includes, but is not limited to, the handover among beamforming base stations based on radio resource management (RRM) measurement evaluation. In the application scenario, the offloading base station performs the RRM measurement on the multiple beams or all of beams transmitted by the terminal and obtains the RRM measurement results; jointly evaluates, based on the multiple beams or all of the beams, the RRM measurement results; instructs, according to the evaluating result, the terminal to be handed over from the TRP of the source offloading base station with beamforming to the TRP of the target offloading base station with beamforming. Alternatively, the TRP of the target offloading base station with beamforming is added additionally. Alternatively, according to the evaluating result, the TRP of the offloading base station with BF is added and the added TRP is activated. Alternatively, according to the evaluating result, the deactivated and configured TRP of the offloading base station with BF is deleted. That is, in the embodiment, multiple beams or all of beams governed by each TRP are taken as RRM measurement granularity, thereby avoiding a poor terminal mobility performance caused by radio resource control measurement evaluation using one beam as the granularity and mobile handover among beamforming base stations and improving the terminal mobility performance.

In one implementation mode, the step of jointly evaluating, based on the multiple beams or all of the beams, the RRM measurement results includes the steps described below.

In step S51, the RRM measurement results corresponding to the multiple beams or all of the beams transmitted by the terminal are acquired.

In step S52, the acquired RRM measurement results are evaluated according to a predetermined RRM measurement result evaluation model.

Through the steps S51 and S52 described above, the acquired RRM measurement results corresponding to the multiple beams or all of the beams are jointly evaluated according to the predetermined RRM measurement result evaluation model, so that the UE can be added to or handed over to a target TRP with better wireless coverage service quality.

In one implementation mode, the step of j ointly evaluating, according to the predetermined RRM measurement result evaluation model, the acquired RRM measurement results includes the steps described below.

In step S61, the RRM measurement results corresponding to the multiple beams or all of the beams transmitted by the terminal are taken as parallel initial measurement sampling values.

In step S62, according to a predetermined sampling period, the initial measurement sampling values are filtered concurrently to obtain parallel intermediate measurement sampling values.

In step S63, a weighted average processing is performed on the parallel intermediate measurement sampling values in a predefined manner and one joint evaluation value outputted serially is obtained, and the joint evaluation value is evaluated by comparing the joint evaluation value with a comparative analysis evaluation value according to a preset inequality rule to obtain a comparative evaluation result. The joint evaluation value and the comparative analysis evaluation value have a same measurement evaluation dimension.

Through the steps S61 to S63 described above, the joint evaluation value outputted serially is obtained, so that the UE can be added to or handed over to a target TRP with better wireless coverage service quality.

In one implementation mode, after obtaining the joint evaluation value and the comparative evaluation result, the method further includes step S71: reporting, according to the RRM measurement result, the joint evaluation value and the comparative evaluation result.

In one implementation mode, the step of reporting, according to the RRM measurement result evaluation reporting rule, the joint evaluation value and the comparative evaluation result includes the steps described below.

In step S81, whether the joint evaluation value and the comparative evaluation result satisfy a predefined RRM measurement event is determined. The RRM measurement event is an event defined by standards of an air interface protocol of a new radio (NR) access system.

In step S82, in response to that the joint evaluation value and the comparative evaluation result satisfy the predefined RRM measurement event or a preset condition set is satisfied, the evaluation result is reported through a measurement report over a ground interface between an offloading base station and a master anchor base station.

Through the steps S81 and S82 described above, in response to determining that the joint evaluation value and the comparative evaluation result satisfy the predefined RRM measurement event, the evaluation result is reported through the measurement report over the ground interface between the offloading base station and the master anchor base station, so that the base station can perform some pre-configuration operations.

In one implementation mode, the RRM measurement event is associated with multiple beams or all of beams governed by a TRP and/or multiple or all of beams governed by another TRP, such that multiple parallel RRM measurement sampling results are generated after the RRM measurement.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on this understanding, the solution provided by the present disclosure may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present disclosure.

Embodiment Four

The embodiment further provides an apparatus for managing a radio link. The apparatus is used for implementing the above-mentioned embodiments and preferred embodiments. What has been described will not be repeated. As used below, the term "module" may be software, hardware or a combination thereof capable of implementing predetermined functions. The apparatus described below in the embodiment may be implemented by software, but implementation by hardware or by a combination of software and hardware is also possible and conceived.

Figure 17:
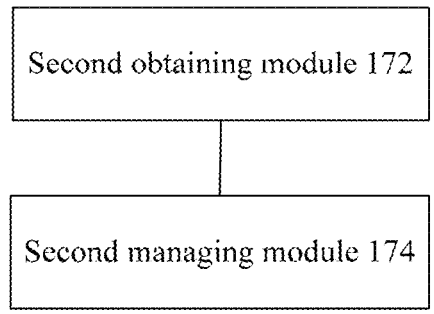
FIG. 17 is a block diagram of another method for managing a radio link according to an embodiment of the present disclosure.

FIG. 17 is a block diagram of another apparatus for managing a radio link according to the embodiment of the present disclosure. As shown in FIG. 17, the apparatus includes: a second obtaining module 172 and a second managing module 174.

1) The second obtaining module 172 is configured to perform RRM measurement on multiple beams or all of beams transmitted by a terminal and obtain RRM measurement results.

2) The second managing module 174 is configured to is evaluate, based on the multiple beams or all of the beams, the RRM measurement results; and instruct, according to the evaluating result, the terminal to be handed over from a TRP of a source offloading base station with beamforming to a TRP of a target offloading base station with beamforming, or add additionally the TRP of the target offloading base station with beamforming; or add, according to the evaluating result, a TRP of an offloading base station with BF and activate the added TRP; or delete, according to the evaluating result, a deactivated and configured TRP of an offloading base station with BF.

In the embodiment, an application scenario of the above radio link management apparatus includes, but is not limited to, the handover among beamforming base stations based on the radio resource management (RRM) measurement evaluation. In the application scenario, the offloading base station performs the RRM measurement on the multiple beams or all of beams transmitted by the terminal and obtains the RRM measurement results; evaluates the RRM measurement results of the multiple beams or all of the beams; instructs, according to the evaluating result, the terminal to hand over from the TRP of the source offloading base station with beamforming to the TRP of the target offloading base station with beamforming, or adds additionally the TRP of the target offloading base station with beamforming; or adds the TRP of the offloading base station with BF according to the evaluating result and activates the added TRP; or deletes the deactivated and configured TRP of the offloading base station with BF according to the evaluating result. That is, in the embodiment, multiple beams or all of beams governed by each TRP are taken as RRM measurement granularity, thereby avoiding a poor terminal mobility performance when the terminal uses one beam as the RRM measurement granularity for radio resource control measurement evaluation and mobile handover among beamforming base stations and improving the terminal mobility performance.

Figure 18:
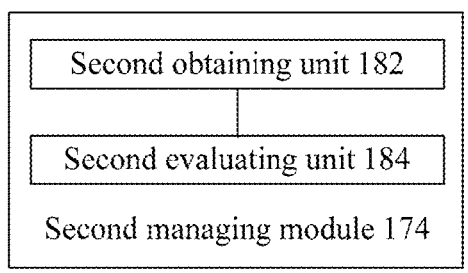
FIG. 18 is a block diagram one of another apparatus for managing a radio link according to an embodiment of the present disclosure.

FIG. 18 is a block diagram one of another apparatus for managing a radio link according to an embodiment of the present disclosure. As shown in FIG. 18, the second managing module 174 includes: a second obtaining unit 182 and a second evaluating unit 184.

1) The second obtaining unit 182 is configure to acquire the RRM measurement results corresponding to the multiple beams or all of the beams transmitted by the terminal.

2) The second evaluating unit 184 is configured to evaluate, according to a predetermined RRM measurement result evaluation model, the acquired RRM measurement results.

Through the apparatus shown in FIG. 18, the acquired RRM measurement results of the multiple beams or all of the beams are evaluated according to the predetermined RRM measurement result evaluation model, so that the UE can be added or handed over to a target TRP with better overall and comprehensive radio coverage service quality.

Figure 19:
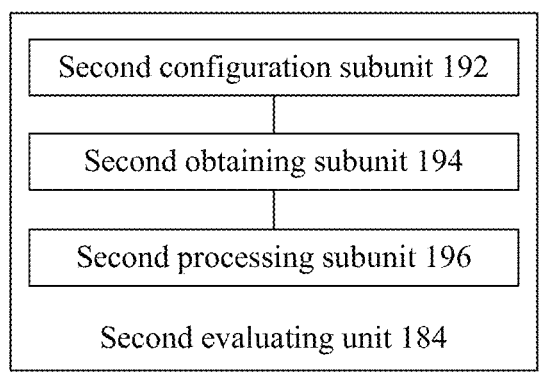
FIG. 19 is a block diagram two of another apparatus for managing a radio link according to an embodiment of the present disclosure.

FIG. 19 is a block diagram two of another apparatus for managing a radio link according to an embodiment of the present disclosure. As shown in FIG. 19, the second evaluating unit 184 includes: a second configuration subunit 192, a second obtaining subunit 194 and a second processing subunit 196.

1) The second configuration subunit 192 is configured to take the RRM measurement results of the multiple beams or all of the beams transmitted by the terminal as parallel initial measurement sampling values.

2) The second obtaining subunit 194 is configured to filter concurrently, according to a predetermined sampling period, the initial measurement sampling values, and obtain parallel intermediate measurement sampling values.

3). The second processing subunit 196 is configured to perform a weighted average processing on the parallel intermediate measurement sampling values in a predefined manner and obtain one joint evaluation value outputted serially, and evaluate the joint evaluation value by comparing the joint evaluation value with a comparative analysis evaluation value according to a preset inequality rule to obtain a comparative evaluation result, where the joint evaluation value and the comparative analysis evaluation value have a same measurement evaluation dimension.

Through the apparatus shown in FIG. 19, the joint evaluation value outputted serially is obtained, so that the UE can be added or handed over to a target TRP with better overall and comprehensive radio coverage service quality.

Figure 20:
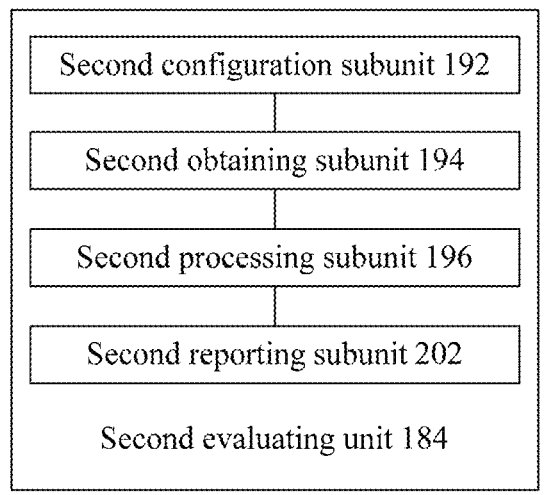
FIG. 20 is a block diagram three of another apparatus for managing a radio link according to an embodiment of the present disclosure.

FIG. 20 is a block diagram three of another apparatus for managing a radio link according to the embodiment of the present disclosure. As shown in FIG. 20, the second evaluating unit 184 further includes: a second reporting subunit 202.

1) The second reporting subunit 202 is configured to report, after obtaining the joint evaluation value and the comparative evaluation result, the joint evaluation value and the comparative evaluation result according to the RRM measurement result evaluation reporting rule.

Figure 21:
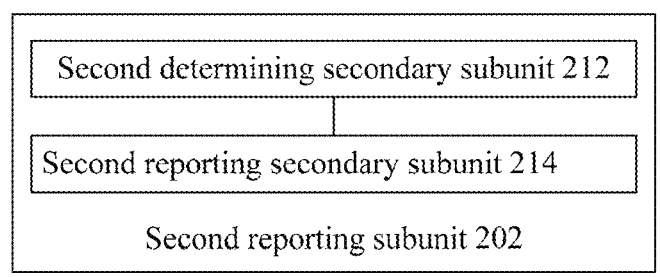
FIG. 21 is a block diagram four of another apparatus for managing a radio link according to an embodiment of the present disclosure.

FIG. 21 is a block diagram four of another apparatus for managing a radio link according to the embodiment of the present disclosure. As shown in FIG. 21, the second reporting subunit 202 includes: a second determining secondary subunit 212 and a second reporting secondary subunit 214.

1) The second determining secondary subunit 212 is configured to determine whether the joint evaluation value and the comparative evaluation result satisfy a predefined RRM measurement event, where the RRM measurement event is an event defined by standards of an air interface protocol of a new radio (NR) access system.

2) The second reporting secondary subunit 214 is configured to report, in response to that the joint evaluation value and the comparative evaluation result satisfy the predefined RRM measurement event or a preset condition set is satisfied, the evaluation result through a measurement report over a ground interface between an offloading base station and a master anchor base station.

Through the apparatus shown in FIG. 21, in response to determining that the joint evaluation value and the comparative evaluation result satisfy the predefined RRM measurement event, the evaluation result is reported through the measurement report over the ground interface between the offloading base station and the master anchor base station, so that the base station can perform some pre-configuration operations.

In one implementation mode, the RRM measurement event is associated with multiple beams or all of beams governed by a TRP and/or the RRM measurement event is associated with the multiple or all of beams governed by another TRP, such that multiple parallel RRM measurement sampling results are generated after the RRM measurement.

Embodiment Five

An embodiment of the present disclosure further provides a storage medium. In the embodiment, the storage medium may be configured to store program codes for executing the steps described below.

In step S1, RRM measurement parameters transmitted by a base station through RRC signaling is received. In step S2, according to the RRM measurement parameters, RRM measurement is performed on multiple beams or all of beams governed by a TRP of a target offloading base station with beamforming, and RRM measurement results are obtained.

In step S3, based on the multiple beams or all of the beams, the RRM measurement results are evaluated jointly, and according to the evaluating result, a handover is performed from a TRP of a source offloading base station with beamforming to the TRP of the target offloading base station with beamforming, or the TRP of the target offloading base station with beamforming is added additionally.

In one implementation mode, the storage medium is further configured to store program codes for executing the following steps:

In step S4, RRM measurement is performed on multiple beams or all of beams transmitted by a terminal and RRM measurement results are obtained.

In step S5, based on the multiple beams or all of the beams, the RRM measurement results are evaluated jointly. According to the evaluating result, the terminal is instructed to be handed over from the TRP of the source offloading base station with beamforming to the TRP of the target offloading base station with beamforming. Alternatively, the TRP of the target offloading base station with beamforming is added additionally. Alternatively, according to the evaluating result, a TRP of an offloading base station with BF is added, and the added TRP are activated. Alternatively, according to the evaluating result, a deactivated and configured TRP of the offloading base station with BF is deleted.

In the embodiment, the storage medium may include, but is not limited to, a USB flash disk, a read-only memory (ROM), a random access memory (RAM), a mobile hard disk, a magnetic disk, an optical disk or another medium capable of storing the program codes.

In the present embodiment, a processor executes the above steps S1, S2 and S3 according to the program codes stored in the storage medium.

In the present embodiment, the processor executes the above steps S4 and S5 according to the program codes stored in the storage medium.

For examples in this embodiment, reference may be made to the examples described in the above embodiments and implementation modes, and the examples will not be repeated in this embodiment.

Each of the above-mentioned modules or steps of the present disclosure may be implemented by a general-purpose computing apparatus, they may be concentrated on a single computing apparatus or distributed on a network consisting of multiple computing apparatuses, and they may be implemented by program codes executable by the computing apparatuses, so that they may be stored in a storage apparatus for execution by the computing apparatuses, and in some circumstances, the illustrated or described steps may be executed in sequences different from those described herein, or the modules or steps may be made into various integrated circuit modules separately, or multiple modules or steps therein may be made into a single integrated circuit module for implementation. In this way, the embodiments of the present invention are not limited to any specific combination of hardware and software.

The above are only the embodiments of the present disclosure and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

In embodiments of the present disclosure, multiple beams or all of beams governed by each TRP are taken as RRM measurement granularity, thereby avoiding a poor mobility performance when the terminal uses one beam as granularity for radio resource control measurement evaluation and mobile handover among beamforming base stations and improving the terminal mobility performance.

What is claimed is:

1. A method of managing a radio link, comprising:
receiving radio resource management (RRM) measurement parameters through radio resource control (RRC) signaling;
performing, according to the RRM measurement parameters and within a measurement time window, a first RRM measurement on a first set of beams of a first base station and a second RRM measurement on a second set of beams of a second base station, and obtaining a first set of RRM measurement results and a second set of RRM results, respectively;
obtaining a first evaluation value by evaluating the first set of RRM measurement results according to a predetermined RRM measurement evaluation model and a second evaluation value by evaluating the second set of RRM measurement results according to the predetermined RRM measurement evaluation model;
performing a first determination that the first evaluation value is higher than a first threshold value added to a first hysteresis value;
performing a second determination that the second evaluation value is lower than a second threshold value minus a second hysteresis value;
sending a measurement report that indicates a condition associated with the first determination and the second determination; and
performing communication with the first base station and deleting a radio link with the second base station based on a RRC message that is received in response to the measurement report.

2. The method of claim 1, wherein the obtaining the first evaluation value by evaluating the first set of RRM measurement results according to the predetermined RRM measurement evaluation model comprises:
filtering the first set of RRM measurement results, and obtaining intermediate measurement sampling values; and
wherein the first evaluation value is obtained by calculating an average of the intermediate measurement sampling values.

3. The method of claim 2, wherein the average of the intermediate measurement sampling values is calculated by performing a weighted average process in which different weights are applied to different beams of the first set of beams.

4. The method claim 1, wherein the first RRM measurement and the second RRM measurement is performed using a common pilot signal transmitted by the first set of beams and the second set of beams.

5. The method of claim 1, further comprising:
obtaining, after performing a synchronization training for a time period, a beamforming fine synchronization substate and a best beam in the first set of beams, wherein the measurement report indicates the beamforming fine synchronization substate and the best beam in the first set of beams.

6. An apparatus for managing a radio link, applied to a terminal, comprising:
a processor configured to:
receive radio resource management (RRM) measurement parameters through radio resource control (RRC) signaling;
perform, according to the RRM measurement parameters and within a measurement time window, a first RRM measurement on a first set of beams of a first base station and a second RRM measurement on a second set of beams of a second base station, and obtain a first set of RRM measurement results and a second set of RRM results, respectively;

obtain a first evaluation value by evaluating the first set of RRM measurement results according to a predetermined RRM measurement evaluation model and a second evaluation value by evaluating the second set of RRM measurement results according to the predetermined RRM measurement evaluation model;

perform a first determination that the first evaluation value is higher than a first threshold value added to a first hysteresis value;

perform a second determination that the second evaluation value is lower than a second threshold value minus a second hysteresis value;

send a measurement report that indicates a condition associated with the first determination and the second determination; and perform communication with the first base station and deleting a radio link with the second base station based on a RRC message that is received in response to the measurement report.

7. The apparatus of claim 6, wherein the evaluating the first RRM measurement results is performed by the processor configured to:

filter the first set of RRM measurement results, and obtain intermediate measurement sampling values; and wherein the first evaluation value is obtained by calculating an average of the intermediate measurement sampling values.

8. The apparatus of claim 7, wherein the average of the intermediate measurement sampling values is calculated by the processor configured to perform a weighted average process in which different weights are applied to different beams of the first set of beams.

9. The apparatus of claim 6, wherein the first RRM measurement and the second RRM measurement is performed using a common pilot signal transmitted by the first set of beams and the second set of beams.

10. The apparatus of claim 6, wherein the processor is further configured to:

obtain, after a synchronization training is performed for a time period, a beamforming fine synchronization substate and a best beam in the first set of beams, wherein the measurement report indicates the beamforming fine synchronization substate and the best beam in the first set of beams.

11. A non-transitory computer readable program storage medium having code stored thereon, the code, when executed by a processor, causing the processor to implement a method comprising:

receiving radio resource management (RRM) measurement parameters through radio resource control (RRC) signaling;

performing, according to the RRM measurement parameters and within a measurement time window, a first RRM measurement on a first set of beams of a first base station and a second RRM measurement on a second set of beams of a second base station, and obtaining a first set of RRM measurement results and a second set of RRM results, respectively;

obtaining a first evaluation value by evaluating the first set of RRM measurement results according to a predetermined RRM measurement evaluation model and a second evaluation value by evaluating the second set of RRM measurement results according to the predetermined RRM measurement evaluation model;

performing a first determination that the first evaluation value is higher than a first threshold value added to a first hysteresis value;

performing a second determination that the second evaluation value is lower than a second threshold value minus a second hysteresis value;

sending a measurement report that indicates a condition associated with the first determination and the second determination; and performing communication with the first base station and deleting a radio link with the second base station based on a RRC message that is received in response to the measurement report.

12. The non-transitory computer readable program storage medium of claim 11, wherein the obtaining the first evaluation value by evaluating the first set of RRM measurement results according to the predetermined RRM measurement evaluation model comprises:

filtering the first set of RRM measurement results, and obtaining intermediate measurement sampling values; and wherein the first evaluation value is obtained by calculating an average of the intermediate measurement sampling values.

13. The non-transitory computer readable program storage medium of claim 12, wherein the average of the intermediate measurement sampling values is calculated by performing a weighted average process in which different weights are applied to different beams of the first set of beams.

14. The non-transitory computer readable program storage medium of claim 11, wherein the first RRM measurement and the second RRM measurement is performed using a common pilot signal transmitted by the first set of beams and the second set of beams.

15. The non-transitory computer readable program storage medium of claim 11, wherein the method further comprises:

obtaining, after performing a synchronization training for a time period, a beamforming fine synchronization substate and a best beam in the first set of beams, wherein the measurement report indicates the beamforming fine synchronization substate and the best beam in the first set of beams.

* * * * *